US012808671B2

(12) United States Patent
Kim

(10) Patent No.: US 12,808,671 B2
(45) Date of Patent: Nov. 24, 2026

(54) METHOD AND APPARATUS FOR DETERMINING COLLISION CANDIDATE OBJECTS, COMPUTER-READABLE STORAGE MEDIUM

(71) Applicant: Han Ik Kim, Daejeon (KR)

(72) Inventor: Han Ik Kim, Daejeon (KR)

( * ) Notice: Subject to any disclaimer, the term of this patent is extended or adjusted under 35 U.S.C. 154(b) by 63 days.

(21) Appl. No.: 18/957,399

(22) Filed: Nov. 22, 2024

(65) Prior Publication Data

US 2025/0085112 A1 Mar. 13, 2025

Related U.S. Application Data

(63) Continuation of application No. PCT/KR2023/006677, filed on May 17, 2023.

(30) Foreign Application Priority Data

May 23, 2022 (KR) ........................ 10-2022-0062679
Oct. 31, 2022 (KR) ........................ 10-2022-0142774

(51) Int. Cl.
*G01C 21/20* (2006.01)

(52) U.S. Cl.
CPC .................................... *G01C 21/20* (2013.01)

(58) Field of Classification Search
None
See application file for complete search history.

(56) References Cited

U.S. PATENT DOCUMENTS 6,757,612 B1 6/2004 Talent et al.
2022/0152826 A1* 5/2022 Danielczuk ............ G06V 20/58

FOREIGN PATENT DOCUMENTS

KR 10-2012-0089517 A 8/2012
KR 10-2019-0135157 A 12/2019
KR 10-2020-0064411 A 6/2020
(Continued)

OTHER PUBLICATIONS

Chavan et al. (2021): "Collide-Pred: Prediction of On-Road Collisions From Surveillance Videos" : Dept. of Computer Science and Engg., Indian Institute of Technology Jodhpur, Jodhpur-342037, India; Retrieved from https://arxiv.org/pdf/2101.08463 (Year: 2021).*
(Continued)

*Primary Examiner* — Abdhesh K Jha

(57) ABSTRACT

Provided is a method for determining a collision candidate object for a tracking target object. The method comprises obtaining position-related information for a tracking target object at a target time point, determining a first collision candidate object group based on position-related information on each object at a first time point prior to the target time point and position-related information on the tracking target object at the target time point, determining a second collision candidate object group based on position-related information on each of a plurality of objects at a second time point prior to the first time point and position-related information on the tracking target object at the target time point, and determining at least one object included in both the first collision candidate object group and the second collision candidate object group as a collision candidate object for the tracking target object at the target time point.

18 Claims, 34 Drawing Sheets

(56) References Cited

FOREIGN PATENT DOCUMENTS

| | | | | | |
|---|---|---|---|---|---|
| KR | 10-2020-00014236 | A | | 12/2020 | |
| WO | WO-2005060640 | A2 | * | 7/2005 | ............. G06V 20/58 |
| WO | 2014/104481 | A1 | | 7/2014 | |

OTHER PUBLICATIONS

International Search Report issued in PCT/KR2023/006677, on Aug. 11, 2023.
Written Opinion issued in PCT/KR2023/006677, on Aug. 11, 2023.
Notice of Grounds for Rejection issued in KR 10-2022-0142774, on Oct. 7, 2024.
Notice of Grounds for Rejection issued in KR 10-2022-0142778, on Oct. 7, 2024.

* cited by examiner

METHOD AND APPARATUS FOR DETERMINING COLLISION CANDIDATE OBJECTS, COMPUTER-READABLE STORAGE MEDIUM

CROSS-REFERENCE TO RELATED APPLICATIONS

The present application is a continuation of International Patent Application No. PCT/KR2023/006677, filed May 17, 2023, which is based upon and claims the benefit of priority to Korean Patent Application No. 10-2022-0062679 filed on May 23, 2022, and Korean Patent Application No. 10-2022-0142774 filed on Oct. 31, 2022. The disclosures of the above-listed applications are hereby incorporated by reference herein in their entirety.

TECHNICAL FIELD

The present disclosure relates to determining a collision candidate object and, more particularly, to a method and apparatus for determining collision candidate objects with a possibility of colliding with a tracking target object among a plurality of moving objects.

BACKGROUND

Various types of moving objects are proposed, which travel along predetermined orbits or paths. For example, various types of moving objects, such as unmanned aerial vehicles including drones, autonomous driving vehicles, and autonomous ships, may be operated to pass through predetermined locations at predetermined times along predefined paths according to an operational management system; various types of satellites may also be configured to move along regular orbits.

The number of moving objects is rapidly increasing regardless of their type; it is becoming increasingly important to detect and monitor in advance the risk of collision that may occur between moving objects and take measures to prevent collisions or perform rapid post-processing after occurrence of a collision for stable operation of the moving objects.

Various methods have been proposed to detect potential collisions between moving objects; however, considering the fact that while the number of moving objects is rapidly increasing, the number of moving objects that may be actually monitored is limited, a method for determining objects at the risk of collision more efficiently and with high accuracy is required.

SUMMARY

To solve the problems described above, an object of the present disclosure is to provide a method that enables reliable monitoring of a collision candidate object by utilizing limited resources by determining, with a high accuracy, an object that exhibits a possibility of actual collision based on determining a collision candidate object group at each of a plurality of time points prior to a target time point and determining a common object as an object that has a risk of collision with a tracking target object at the target time point.

To solve the problem above, another object of the present disclosure is to provide an apparatus that enables reliable monitoring of a collision candidate object by utilizing limited resources by determining, with a high accuracy, an object that exhibits a possibility of actual collision based on determining a collision candidate object group for each of a plurality of time points prior to a target time point and determining a common object as an object that has a risk of collision with a tracking target object at the target time point.

Also, to solve the problem above, another object of the present disclosure is to provide a method that enables determination of a collision candidate object for a tracking target object at a specific time point using the intersection of an angular range in which a collision candidate may exist and an area in which an object following an elliptical orbit may exist among a plurality of objects moving along the elliptical orbit based on a gravitational field from a reference point.

To solve the problem above, another object of the present disclosure is to provide an apparatus that enables determination of a collision candidate object for a tracking target object at a specific time point using the intersection of an angular range in which a collision candidate may exist and an area in which an object following an elliptical orbit may exist among a plurality of objects moving along the elliptical orbit based on a gravitational field from a reference point.

However, the technical problem to be solved by the present disclosure is not limited to the above but may be expanded to other various problems belonging to the scope not departing from the technical principles and domain of the present disclosure.

To achieve the object above, a method for determining a collision candidate object according to one embodiment of the present disclosure, which is a method for determining a collision candidate object for a tracking target object, performed by a computing device that includes a processor and a memory, may comprise obtaining position-related information for a tracking target object at a target time point; determining a first collision candidate object group for the tracking target object at the target time point based on position-related information on each of a plurality of objects at a first time point prior to the target time point and position-related information on the tracking target object at the target time point; determining a second collision candidate object group for the tracking target object at the target time point based on position-related information on each of a plurality of objects at a second time point prior to the first time point and position-related information on the tracking target object at the target time point; and determining at least one object included in both the first collision candidate object group and the second collision candidate object group as a collision candidate object for the tracking target object at the target time point.

According to one aspect, the position-related information corresponding to the tracking target object or at least one object among the plurality of objects may include at least one of position range determination information or velocity information for an object corresponding to the position-related information.

According to one aspect, the position range determination information may include at least one of position estimation information or position error information for an object corresponding to the position-related information, and the existence range of an object corresponding to the position-related information, being centered at an estimated position according to the position estimation information, may include the maximum error range according to the position error information.

According to one aspect, the existence range of an object corresponding to the position-related information may be defined to further include a maximum separation distance deviated by at least one of the gravitational force or an external force from a defined trajectory of the object corresponding to the position-related information.

According to one aspect, each of the plurality of objects may be configured to have a further expanded existence range obtained by adding the existence range of the tracking target object to each existence range, and the tracking target object may be configured to have a reduced existence range expressed only with an estimated position of the tracking target object.

According to one aspect, the collision probability of a first object for the tracking target object may be determined based on the maximum separation distance from the center of the expanded existence range of the first object and the distance between the first object and the tracking target object.

According to one aspect, the method may be intended to determine an object of which the expanded existence range at the target time point is expected to include the position of the tracking target object as the collision candidate object.

According to one aspect, the existence range may be configured to increase as time elapses from the measurement time point of the position estimation information.

According to one aspect, the determining of the first collision candidate object group may include determining a first time point existence area of a collision candidate object for a tracking target object at the target time point; and determining objects positioned within the first time point existence area at the first time point among the plurality of objects as a first collision candidate object group.

According to one aspect, the first time point existence area may be determined based on the position of a tracking target object at the target time point, the maximum velocity and the minimum velocity of the plurality of objects, and a time interval between the target time point and the first time point.

According to one aspect, the first time point existence area may have a three-dimensional spherical shell shape having a center at the position of a tracking target object at the target time point; a diameter determined according to the maximum velocity and minimum velocity and the time interval between the target time point and the first time point; and a first width in the direction toward the center.

According to one aspect, the first width may be determined based on the existence range for a plurality of objects at the target time point; the existence range increasing according to the maximum velocity, the minimum velocity, and a time interval between the target time point and the first time point; and the existence range increasing according to at least one of the gravitational force or an external force.

According to one aspect, the first time point existence area may be determined as the three-dimensional spherical shell shape applied to at least one of a satellite, an unmanned aerial vehicle, or a drone.

According to one aspect, the first time point existence area may have a two-dimensional annular disk shape having a center at the position of a tracking target object at the target time point; having a diameter determined according to the maximum velocity, the minimum velocity, and a time interval between the target time point and the first time point; having a second width in the direction toward the center; and being included in a predetermined plane.

According to one aspect, the second width may be determined based on the existence range for a plurality of objects at the target time point; the existence range increasing according to the maximum velocity, the minimum velocity, and a time interval between the target time point and the first time point; and the existence range increasing according to at least one of the gravitational force or an external force.

According to one aspect, the first time point existence area may be determined as the two-dimensional annular disk shape applied to at least one of a ship or an autonomous driving vehicle.

According to one aspect, the determining of the second collision candidate object group may include determining a second time point existence area of a collision candidate object for a tracking target object at the target time point; and determining objects positioned within the second time point existence area at the second time point among the plurality of objects as a second collision candidate object group.

According to one aspect, the second time point existence area may be determined based on the position of a tracking target object at the target time point, the maximum velocity and the minimum velocity of the plurality of objects, and a time interval between the target time point and the second time point.

An apparatus for determining a collision candidate object for a tracking target according to another embodiment of the present disclosure comprises a processor and a memory, wherein the processor may be configured to obtain position-related information for a tracking target object at a target time point; determine a first collision candidate object group for the tracking target object at the target time point based on position-related information on each of a plurality of objects at a first time point prior to the target time point and position-related information on the tracking target object at the target time point; determine a second collision candidate object group for the tracking target object at the target time point based on position-related information on each of a plurality of objects at a second time point prior to the first time point and position-related information on the tracking target object at the target time point; and determine at least one object included in both the first collision candidate object group and the second collision candidate object group as a collision candidate object for the tracking target object at the target time point.

A computer-readable storage medium including commands executable by a processor according to another embodiment of the present disclosure, wherein the commands may be configured to instruct the processor to obtain position-related information for a tracking target object at a target time point; determine a first collision candidate object group for the tracking target object at the target time point based on position-related information on each of a plurality of objects at a first time point prior to the target time point and position-related information on the tracking target object at the target time point; determine a second collision candidate object group for the tracking target object at the target time point based on position-related information on each of a plurality of objects at a second time point prior to the first time point and position-related information on the tracking target object at the target time point; and determine at least one object included in both the first collision candidate object group and the second collision candidate object group as a collision candidate object for the tracking target object at the target time point.

To achieve the object above, a method for determining a collision candidate object for a space object according to one embodiment of the present disclosure may be performed by a computing device comprising a processor and a memory and determine a collision candidate object for a tracking target object among a plurality of objects moving along an elliptical orbit based on the gravitational field from a reference point. The method may comprise determining a collision point based on position-related information for a tracking target object at a target time point; and determining a first collision candidate object group for the tracking target object at the target time point based on position-related information on each of a plurality of objects at a first time point prior to the target time point, first time point angular range information indicating an angular range centered around the reference point, in which the collision candidate object may exist at the first time point, and information on an elliptical orbit existence area that includes all elliptical orbits using the reference point as the center point and passing through the collision point.

According to one aspect, the position-related information corresponding to the tracking target object or at least one object among the plurality of objects may include at least one of position range determination information or velocity information for an object corresponding to the position-related information.

According to one aspect, the position range determination information may include at least one of position estimation information or position error information for an object corresponding to the position-related information, and the existence range of an object corresponding to the position-related information, being centered at an estimated position according to the position estimation information, may include the maximum error range according to the position error information.

According to one aspect, the existence range of an object corresponding to the position-related information may be defined to further include a maximum separation distance deviated by at least one of an uneven gravitational field or an external force due to the gravitational field from a reference point of an object corresponding to the position-related information.

According to one aspect, each of the plurality of objects may be configured to have a further expanded existence range obtained by adding the existence range of the tracking target object to each existence range and have a reduced existence range expressed only with an estimated position of the tracking target object.

According to one aspect, the collision probability of a first object for the tracking target object may be determined based on the maximum separation distance from the center of the expanded existence range of the first object and the distance between the first object and the tracking target object.

According to one aspect, the method may be intended to determine an object of which the expanded existence range at the target time point is expected to include the position of the tracking target object as the collision candidate object.

According to one aspect, the existence range may be configured to increase as time elapses from the measurement time point of the position estimation information.

According to one aspect, the determining of the first collision candidate object group may include determining a first time point existence area of a collision candidate object for a tracking target object at the target time point; and determining objects positioned within the first time point existence area at the first time point among the plurality of objects as a first collision candidate object group.

According to one aspect, the first time point existence area may include an overlapping area between an angular range according to the first time point angular range information and the elliptical orbit existence area.

According to one aspect, the central angular position of the first time point angular range may be separated from the angular position of the collision point by an angle determined by multiplication of the average angular velocity of the plurality of objects and a time interval between the target time point and the first time point.

According to one aspect, the first time point angular range may be determined by adding a variation range determined based on the maximum angular velocity and the minimum angular velocity of the plurality of objects and a time interval between the target time point and the first time point to a reference angular range including the object existence range at the target time point.

According to one aspect, the maximum angular velocity may be an angular velocity when an object is at the farthest position from the reference point in an elliptical orbit having the largest semi-major axis and the smallest eccentricity among the elliptical orbits of the plurality of objects, and the minimum angular velocity may be an angular velocity when the object is at the farthest position from the reference point in an elliptical orbit having the smallest semi-major axis and the largest eccentricity among the elliptical orbits of the plurality of objects.

According to one aspect, the elliptical orbital existence area may be expressed as a Rose function having coefficients configured so that the area defined by the function includes all elliptical orbits centered at the reference point and passing through the collision point.

According to one aspect, the Rose function may include a Limacon function.

According to one aspect, the overlapping area between the angular range according to the first time point angular range information and the elliptical orbit existence area may be expressed as a function defining an ellipse that includes all of four intersections between two line segments representing the angular range and the elliptical orbit existence area.

According to one aspect, the first time point existence area may be a torus area formed by axially symmetric transformation of an ellipse that includes all of the four intersections with respect to the rotation axis passing through the reference point and the collision point.

According to one aspect, the method may further comprise determining a second collision candidate object group for the tracking target object at the target time point based on position-related information for each of a plurality of space objects at a second time point prior to the target time point, second time point range angular information representing an angular range centered at the reference point, in which the collision candidate object may exist at the second time point, and information on the elliptical orbit existence area; and determining at least one object included in both the first collision candidate object group and the second collision candidate object group as a collision candidate object for the tracking target object at the target time point.

To solve the problem above, an apparatus according to another embodiment of the present disclosure, which is an apparatus for determining a collision candidate object for a tracking target object among a plurality of objects moving along elliptical orbits based on the gravitational field from a reference point, may comprise a processor and a memory, wherein the processor may be configured to determine a collision point based on position-related information for a tracking target object at a target time point; and determine a first collision candidate object group for the tracking target object at the target time point based on position-related information on each of a plurality of objects at a first time point prior to the target time point, first time point angular range information indicating an angular range centered around the reference point, in which the collision candidate object may exist at the first time point, and information on an elliptical orbit existence area that includes all elliptical orbits using the reference point as the center point and passing through the collision point.

To solve the problem above, a computer-readable storage medium including commands executable by a processor according to another embodiment of the present disclosure, wherein the commands may be configured to instruct the processor to determine a collision point based on position-related information for a tracking target object at a target time point; and determine a first collision candidate object group for the tracking target object at the target time point based on position-related information on each of a plurality of objects at a first time point prior to the target time point, first time point angular range information indicating an angular range centered around the reference point, in which the collision candidate object may exist at the first time point, and information on an elliptical orbit existence area that includes all elliptical orbits using the reference point as the center point and passing through the collision point.

The present disclosure may provide the following effects. However, since it is not meant that a specific embodiment has to provide all of or only the following effects, the technical scope of the present disclosure should not be regarded as being limited by the specific embodiment.

According to a method and apparatus for determining a collision candidate object according to one embodiment of the present disclosure may determine with a high accuracy an object that exhibits a possibility of actual collision based on determining a collision candidate object group for each of a plurality of time points prior to a target time point and determining a common object as an object that has a risk of collision with a tracking target object at the target time point.

Also, according to a method and apparatus for determining a collision candidate object according to one embodiment of the present disclosure may determine a collision candidate object for a tracking target object at a specific time point using the intersection of an angular range in which a collision candidate may exist and an area in which an object following an elliptical orbit may exist among a plurality of objects moving along an elliptical orbit based on a gravitational field from a reference point.

Therefore, the present disclosure allows for more reliable monitoring of collision candidate objects with a high risk of collision without involving monitoring of unnecessary objects, thereby enabling fast collision risk prevention measures on a large number of moving objects by utilizing limited temporal or physical resources or enabling rapid execution of post-processing.

DETAILED DESCRIPTION

Figure 1:
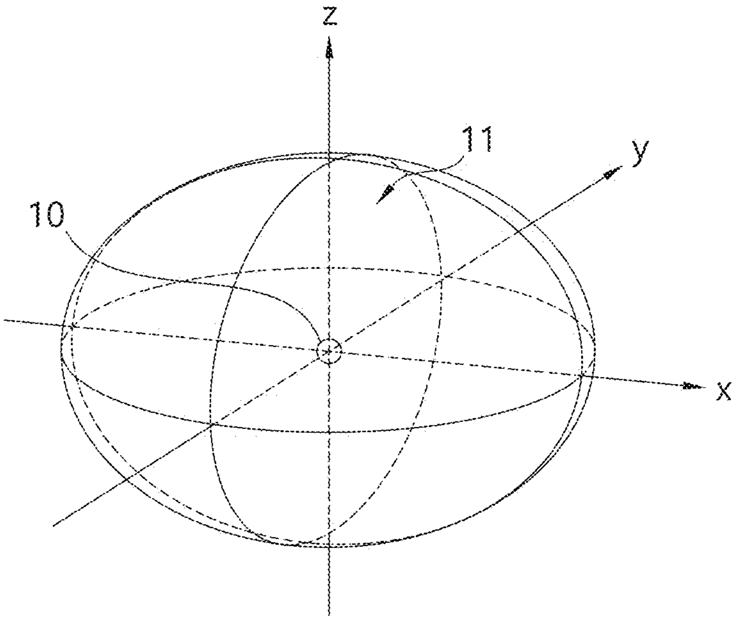
FIG. 1 illustrates a range in which an object exists, which is defined as a three-dimensional volume.

Since the present disclosure may be modified in various ways and may provide various embodiments, specific embodiments will be depicted in the appended drawings and described in detail with reference to the drawings.

However, it should be understood that the specific embodiments are not intended to limit the gist of the present disclosure to the specific embodiments; rather, it should be understood that the specific embodiments include all of the modifications, equivalents or substitutes belonging to the technical principles and scope of the present disclosure.

The terms such as first and second are introduced to describe various elements, but the elements should not be limited by the terms. The terms are used only for the purpose of distinguishing one from the other elements. For example, a first element may be called a second element without leaving the technical scope of the present disclosure, and similarly, the second element may be called the first element. The term and/or includes any one of a combination of a plurality of related disclosed elements or a plurality of related disclosed elements.

If an element is said to be “connected” or “attached” to a different element, the former may be connected or attached directly to the different element, but another element may be present between the two elements. On the other hand, if an element is said to be “directly connected” or “directly attached” to a different element, it should be understood that there is no other element between the two elements.

Terms used in this document are intended only for describing a specific embodiment and are not intended to limit the technical scope of the present disclosure. A singular expression should be understood to indicate a plural expression unless otherwise explicitly stated. The term of “include” or “have” is used to indicate existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

In what follows, with reference to appended drawings, preferred embodiments of the present disclosure will be described in more detail. In describing the present disclosure, to help overall understanding, the same reference symbols are used for the same elements in the drawings, and repeated descriptions of the same elements will be omitted.

SUMMARY

As described above, various types of moving objects are proposed, which travel along a predetermined orbit or path. For example, various types of moving objects, such as unmanned aerial vehicles including drones, autonomous driving vehicles, and autonomous ships, may be operated to pass through predetermined locations at predetermined times along predetermined paths according to an operational management system; various types of satellites may also be configured to move along a regular orbit.

The number of moving objects is rapidly increasing regardless of their type; it will be more important to detect and monitor in advance the risk of collision that may occur between moving objects and take measures to prevent collisions or perform rapid post-processing after occurrence of a collision for stable operation of the moving objects.

Particularly, the trend is especially more evident in the case of satellites, where the number of objects is increasing significantly. The expected technological trends in the satellite field may be summarized as mass production, miniaturization, and low-altitude operation. In relation to mass production, the satellite technology field is aiming to deploy a large number of satellites in a predetermined formation, which is referred to as a mega constellation. Also, newly developed satellites are becoming smaller and lighter compared to conventional large-sized satellites; it is preferred to secure a large number of satellites to perform shared missions rather than to perform a variety of missions with a small number of satellites. Also, unlike conventional satellites the majority of which comprise high-altitude geostationary Earth Orbit (GEO) satellites, recent interest has shifted toward low Earth Orbit (LEO) or very low Earth Orbit (VLEO) satellites. Low Earth Orbit satellites operating at altitudes of 200-2000 km are getting attention due to technological advancements that enable small-sized satellites to match the performance of large-sized satellites. These low-orbit satellites may observe the Earth in greater detail due to their reduced proximity to the surface and may also communicate with entities on the surface using less power.

As a large number of LEO or VLEO satellites are expected to be newly built, the probability of collision between satellites or between a satellite and other object is expected to increase inevitably. The collision target may be another satellite or a space object (e.g., debris). It may be required to monitor the probability of collision at very frequent intervals and avoid collision or take measures against collision even for a single monitoring target satellite. In other words, considering the fact that while the number of moving objects, including satellites, is rapidly increasing, the number of moving objects that may be actually monitored is limited, a method for determining objects with a collision risk more efficiently and with high accuracy is required.

A method and apparatus for determining a collision candidate object according to one embodiment of the present disclosure, intended to solve the problem above, may enable reliable monitoring of a collision candidate object by utilizing limited resources by determining with a high accuracy an object that exhibits a possibility of actual collision based on determining a collision candidate object group for each of a plurality of time points prior to a target time point and determining a common object as an object that has a risk of collision with a tracking target object at the target time point. In other words, for example, among moving objects such as satellites, objects with a risk of collision with a tracking target object may be detected with improved accuracy, thereby reducing the number of objects subject to intensive monitoring and enabling efficient management and control of moving objects. In the present disclosure, an ‘object’ may be referred to as a ‘moving object.’

Meanwhile, although satellites are mentioned as an example of an object, it should be understood that the object according to the method for determining a collision candidate according to embodiments of the present disclosure is not limited to satellites; any moving object, such as an unmanned aerial vehicle, a drone, an unmanned ship, or an unmanned vehicle, may be included within the range of object according to the present disclosure.

According to one aspect of the present disclosure, an algorithm for selecting a potential collision object may be provided. For example, if it is assumed that information on at least one or more of trajectory, size information, position information, position error, velocity range, and velocity error is obtained for each object at each time in the time series sequence $t_0, \ldots, t_f$ of a plurality of objects $O_i$, an algorithm may be disclosed for finding a collision candidate object in the time series sequence $t_0, \ldots, t_f$ of a specific object $O_1$, which is a tracking target object.

More specifically, for example, 1) a step of estimating at least one or more of trajectory, position error, velocity range, and velocity error of a plurality of objects $O_i$ at time point $t_0, \ldots, t_f$, 2) A step of selecting a group of preliminary collision candidate objects with a possibility of approaching the position of $O_1$ at time point $t_j$ by utilizing at least one of position information and position error of $O_i$s at time point $t_k$ earlier than $t_j$ based on at least one of position information, position error, velocity range, velocity error, and size information of the specific object $O_1$ at the specific time point $t_j$, 3) A step of performing the process of 2) described above at time point $t_l$ earlier than $t_k$, 4) A step of selecting common preliminary candidate object groups among the candidate object groups selected in 2) and 3) described above and designating them as collision candidate objects, 5) The steps 2) to 4) described above may be performed during the time sequence $t_2, \ldots, t_f$ to determine objects that may collide with the object $O_1$, which is the tracking target object, at each time point. Accordingly, objects that may collide with the object $O_1$, which is the tracking target object, may be extracted at each time point, and more reliable monitoring may be performed on the extracted objects.

In what follows, a method and apparatus for determining a collision candidate object according to embodiments of the present disclosure will be described in more detail.

Existence Range and Position-Related Information

According to one aspect of the present disclosure, an algorithm for determining a collision candidate for a moving object may be provided. The method according to the embodiments may assume a situation in which the controller performance of the moving object may respond quickly to a path change caused by the environment and return to a defined trajectory. For example, the method may support a situation in which, while a moving object such as a drone moves along a predetermined trajectory and an external force such as wind acts on the drone and causes the drone to deviate from the predetermined trajectory by a predetermined distance, the drone may still readjust its movement path in response to the external force and return to the predetermined trajectory.

Meanwhile, in the present disclosure, a 'tracking target object' may refer to an object used as a reference for determining the presence of another object with a risk of collision. In other words, a method for determining a collision candidate object according to embodiments of the present disclosure may select a candidate object with a possibility of colliding with a 'tracking target object' at each time point of at least one or more target time points. In other words, the 'tracking target object' may also be referred to as a 'subject.'

The 'target time point' may be a reference time point for determining the possibility of collision between the tracking target object and a collision candidate object. According to one aspect of the present disclosure, by determining collision candidate objects at a plurality of target time points arranged in a time series, collision candidate objects may be determined and monitored at each time point within a predetermined time interval.

In the embodiments of the present disclosure, 'position-related information' may be acquired for each object, including the tracking target object. The position-related information may be understood as a concept that includes information on the movement of an object, such as the range of position or velocity of the corresponding object at each time point. For example, at least one of the trajectory, position error, velocity range, velocity error, and size information described above may be included in the position-related information.

According to one aspect, the position-related information corresponding to at least one object among the tracking target object or the plurality of objects being assessed for the possibility of collision may include at least one of position range determination information or velocity information for the object corresponding to the position-related information.

Here, the 'position range determination information' may include at least one of position estimation information or position error information for an object corresponding to the position-related information. In other words, the position range determination information may include an estimate of the position of the target object at the corresponding time point and information on the accuracy of the estimate.

In this regard, FIG. 1 illustrates a range in which an object exists, which is defined as a three-dimensional volume. All moving objects have an error in their position estimation values, and this error may be expressed by defining an existence range of the moving object as a three-dimensional volume. As shown in FIG. 1, the estimate of the position of the moving object 10 inevitably involves an error; therefore, considering the error range of the estimate of the position of the moving object 10 at the corresponding time point, even if an estimate of the position of the moving object 10 is obtained, the moving object 10 may actually be located at an arbitrary point within the existence range 11 defined as a three-dimensional volume. According to one aspect, the existence range of an object corresponding to the position-related information may be understood as being centered at the estimated position according to the position estimation information and including the maximum error range according to the position error information.

To determine a collision candidate object, a criterion is required as to whether to determine a particular object as a collision candidate object for the tracking target object. In this regard, various definitions may be applied to describe the meaning of 'collision'; however, according to one non-restrictive aspect of the present disclosure, for example, an object of which the existence range at the target time point is expected to include the position of the tracking target object may be determined as a collision candidate object.

Figure 2:
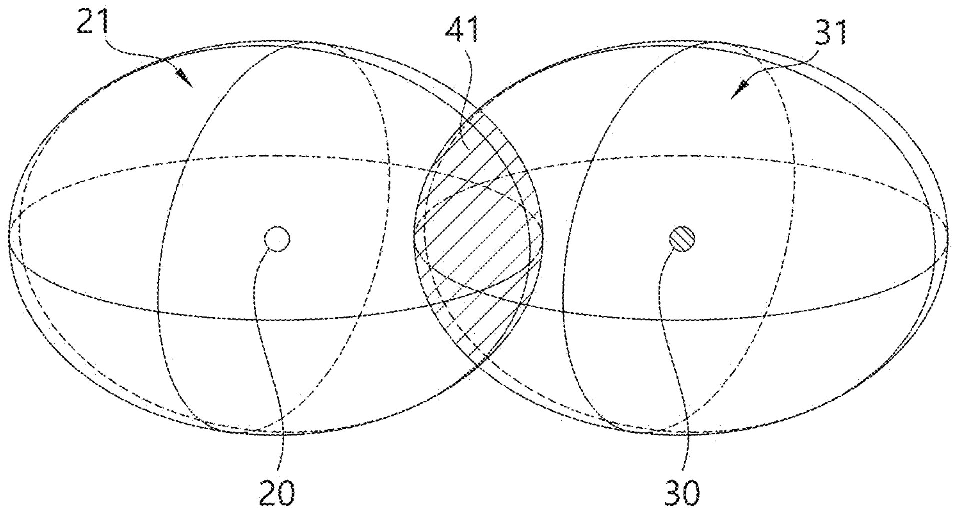
FIG. 2 illustrates a situation in which existence ranges of a plurality of objects overlap with each other.

More generally, an object that has a probability or possibility of colliding with a tracking target object at a target time point may be determined as a collision candidate object. Here, the collision probability may be expressed by, for example, the extend of overlap between the existence ranges of two objects. FIG. 2 illustrates a situation in which existence ranges of a plurality of objects overlap with each other. As illustrated in FIG. 2, the existence range 21 of the first object 20 and the existence range 31 of the second object 30 have an overlapping region 41. According to one aspect, the first object 20 and the second object 30, which have the overlapping region 41 within their respective existence ranges, may be understood as having a possibility of collision with each other. Also, according to one aspect, it is also possible to define the collision probability based on, for example, the volume of the overlapping region 41; however, it should be noted that technical principles of the present disclosure is not limited to the specific description. According to one aspect, an object with a collision probability exceeding a predetermined threshold may also be determined as a collision candidate object for the tracking target object.

Reflection of Gravitational Force and External Force

The moving object may be configured to move along a predefined trajectory, such as the orbit of a satellite or a predefined path of an unmanned aerial vehicle. However, a moving object may not move exactly along the predefined trajectory due to environmental factors, such as the gravitational force of the moon or an external force such as wind. In this regard, according to one aspect of the present disclosure, the existence range of an object may be defined to further include, in addition to the existence range due to the position estimation information and the position error of the object, the maximum separation distance deviated by at least one of the gravitational force or an external force from the predefined trajectory of the object corresponding to the position-related information. In other words, the existence range of an object may be represented by expanding the existence range of the moving object to account for the influence of at least one of the gravitational and external forces.

Figure 3:
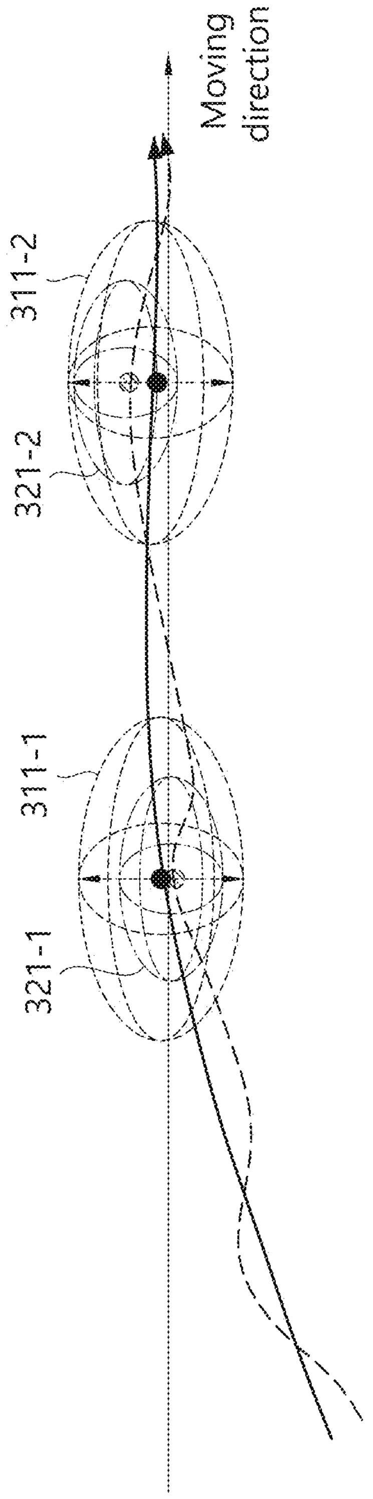
FIG. 3 illustrates an existence range of a moving object along a predefined trajectory that includes an existence range of a moving object along a trajectory on which a gravitational force or an external force is exerted.

FIG. 3 illustrates an existence range of a moving object along a predefined trajectory that includes an existence range of a moving object along a trajectory on which a gravitational force or an external force is exerted. As illustrated in FIG. 3, the defined trajectory 310 of an object moving in the direction from left to right may have a smooth curved shape. However, while the moving object travels along the defined trajectory 310, if the moving object is affected by an external factor, for example, at least one of a gravitational force or an external force, the object may deviate from the defined trajectory 310 by a predetermined distance and may be controlled to return to a re-defined trajectory 310 in response thereto. Accordingly, the actual trajectory 320 of the object affected by an external factor, which includes at least one of the gravitational force or the external force, may not be smooth but may have a distorted, uneven shape, as illustrated in FIG. 3. However, as illustrated in FIG. 3, if the existence range 311 of an object applied in a defined trajectory is defined to include the existence range 321 of the object in a trajectory affected by gravity or an external force, the trajectory of the object affected by gravity or an external force may be expressed as the conventional, defined trajectory 310.

As illustrated in FIG. 3, the existence range 311-1 of the object along a defined trajectory at a first time point when gravity or an external force acts on the object toward the lower side of the drawing may be defined to include the existence range 321-1 of the object of the trajectory reflecting gravity or an external force, and the existence range 311-2 of the object along the defined trajectory at a second time point when gravity or an external force acts on the object toward the upper side of the drawing may also be defined to include the existence range 321-2 of the trajectory reflecting gravity or an external force. In other words, by setting the existence range of an object to account for the maximum separation distance from a defined trajectory due to the gravity or an external force, the possibility of collision may be assessed, which reflects the case where gravity or an external force is exerted.

Expansion and Reduction of Existence Range

The characteristics of a moving object may be defined by at least one of the existence range and the velocity range. Here, the existence ranges of two moving objects may be represented by two three-dimensional volumes as described above with reference to FIG. 2; for example, if the existence range of one of the moving objects is expanded to match the existence range of the other moving object, the other moving object may be represented without employing an existence range. One of the two moving objects may have an expanded existence range obtained by adding the existence range of the other moving object to the existing existence range, and the other moving object may have a reduced existence range represented only by the estimated position of the moving object.

Figure 4:
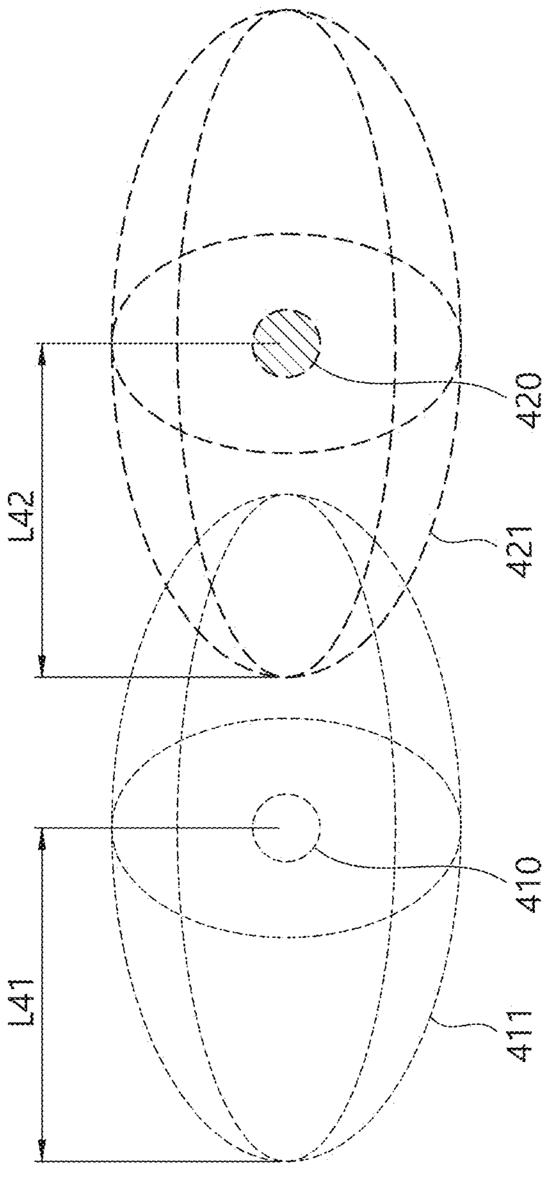
FIG. 4 illustrates existence ranges of two objects before their existence range is expanded.
Figure 5:
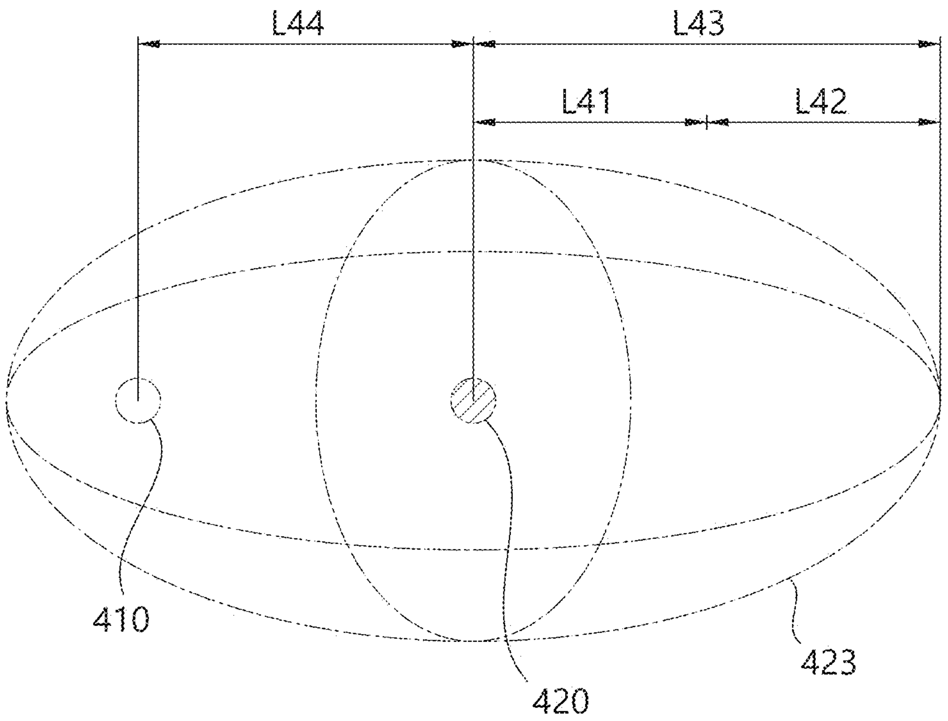
FIG. 5 illustrates an existence range representation of one object according to the expansion of the existence range.

For example, FIG. 4 illustrates existence ranges of two objects before their existence range is expanded, and FIG. 5 illustrates an existence range representation of one object according to the expansion of the existence range. As illustrated in FIG. 4, the existence range 411 of the third object 410 and the existence range 421 for the fourth object 420 may be represented by two three-dimensional volumes. Here, as shown in FIG. 5, if the existence range of the fourth object 420 is expanded to match the existence range of the third object 410, the fourth object 420 may have an expanded existence range 423, and the third object 410 may be represented without employing an existence range, which may be referred to as having a reduced existence range.

The existence range may also be represented by the maximum distance from an object to the existence range. For example, referring to FIGS. 4 and 5, the existing existence range 411 of the third object 410 may be represented by a first distance L41, and the existing existence range 421 of the fourth object 420 may be represented by a second distance L42. In this regard, if the existence range of the third object 410 is moved to the existence range of the fourth object 420, the fourth object 420 may have an expanded existence range 423 represented by a third distance L43, which is the sum of the first distance L41 and the second distance L42.

As described above, when the existence ranges of two moving objects are converted into an expanded existence range and a reduced existence range, the collision probability of the two moving objects may be calculated based on the relative distance between the position of the moving object with the reduced existence range and the center of the moving object with the expanded existence range. More specifically, for example, as shown in FIG. 5, the collision probability between the third object 410 and the fourth object 420 may be determined based on the maximum separation distance L43 from the center of the expanded existence range 423 of the fourth object 420 and the distance L44 between the third object 410 and the fourth object 420.

Figure 6:
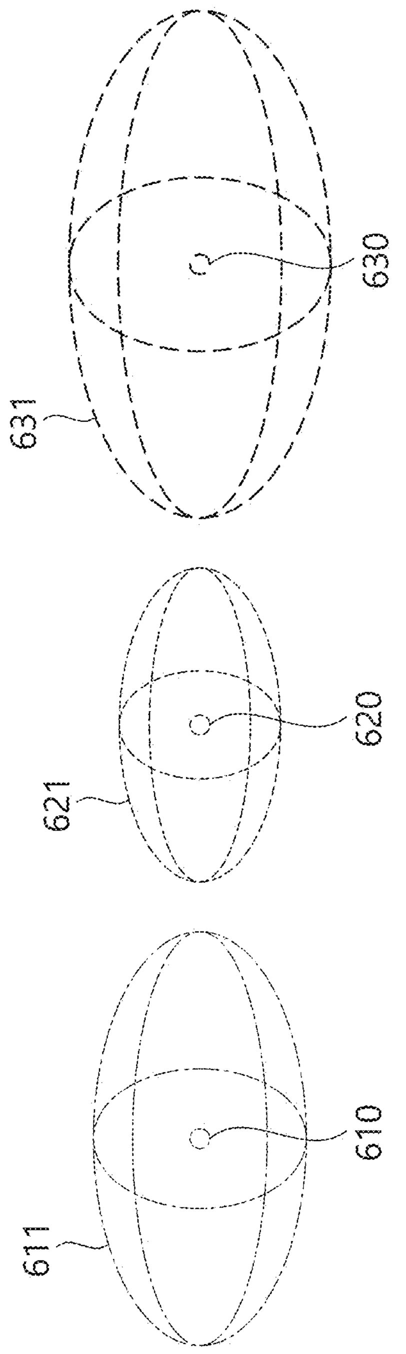
FIG. 6 illustrates different existence ranges according to each object.

In relation to the description above, moving objects may have different existence ranges. FIG. 6 illustrates different existence ranges according to each object. As shown in FIG. 6, the existence range 611 of the fifth object 610, the existence range 621 of the sixth object 620, and the existence range 631 of the seventh object 630 may be different from each other. The position estimate of a moving object may have varying accuracy depending on which sensor or measurement method is used, and accordingly, the existence range may also vary depending on the sensor or measurement method employed. In addition, even when the same sensor or measurement method is used for the same moving object, the accuracy of the position estimate may gradually decrease over time with respect to the estimation time.

Accordingly, different existence ranges may be applied to the same moving object depending on the time point at which the existence range is determined, and for example, the existence range may be configured to increase as time progresses from the time point of measuring the position estimate.

In one aspect of the present disclosure, the presence of different existence ranges for each moving object may increase the complexity of the process for determining a collision candidate object. Therefore, according to one aspect, it is possible to eliminate the existence range of one target for checking the possibility of a collision, i.e., the tracking target object and to collectively expand the existence range for each of the other moving objects, i.e., a plurality of objects to be examined. For example, the existing existence range of the tracking target object may be added to each of a plurality of objects having different existence ranges to form an expanded existence range, and the tracking target object may have a reduced existence range represented only by the estimated position of the tracking target object.

In other words, each of the plurality of objects, which are targets to be examined as to whether they are collision candidate objects, may be configured to have an expanded existence range obtained by adding the existence range of the tracking target object to each existence range, and the tracking target object may be configured to have a reduced existence range represented only by the estimated position of the tracking target object.

Therefore, according to one aspect of the present disclosure, an object having a possibility of collision with a tracking target object at a target time point may be understood as an object whose existence range at the target time point includes the position of the tracking target object. The description above may be referred to as the existence range of the corresponding object intruding on the tracking target object. In this regard, the tracking target object, which is a moving object being monitored for the occurrence of a collision, may be referred to as a 'subject' in the present disclosure, and a moving object approaching the collision point may be referred to as a 'potential intruder.' In the present disclosure, all of a plurality of objects excluding the tracking target object may act as 'potential intruders.' If the existence range of the potential intruder at the target time point includes the position of the subject, the collision probability for the subject may be calculated, and the potential intruder may be referred to as an 'intruder.'

The method for determining a collision candidate object according to the embodiments of the present disclosure may be, for example, intended to determine an object whose expanded existence range at the target time point is expected to include the position of the tracking target object as a collision candidate object. According to another aspect, more specifically, an object whose probability of collision with the tracking target object is greater than a threshold value may be determined as a collision candidate object. For example, the probability of collision of a first object with the collision candidate object may be determined based on the maximum separation distance from the center of the expanded existence range of the first object and the distance between the first object and the tracking target object; more specifically, the probability of collision of the first object with the collision candidate object may be determined as a ratio of the distance between the first object and the tracking target object to the maximum separation distance from the center of the expanded existence range of the first object.

Variation of Existence Distance Over Time

Figure 7:
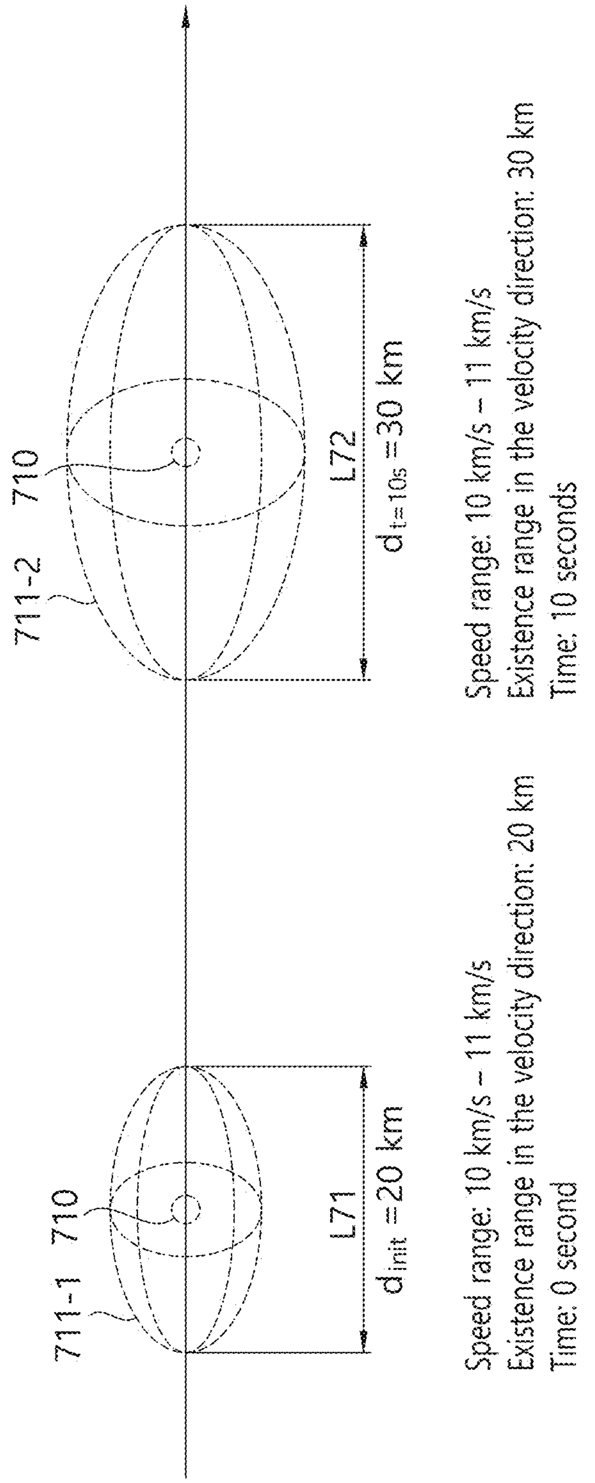
FIG. 7 illustrates expansion of an existence range of an object over time.

FIG. 7 illustrates expansion of an existence range of an object over time. The operational velocity range of a plurality of objects, which are the subject of assessment as to whether they are potential intruders, i.e., collision candidates, may be specified by the minimum velocity $v_{min}$ and the maximum velocity $v_{max}$. When the existence distance in the initial velocity direction for the initial existence range $V_{init}$ is $d_{init}$, the existence distance in the velocity direction of the object after t seconds when the object exhibits a straight-line motion may be calculated as follows.

$$d_t = d_{init} + (v_{max} - v_{min})\,t$$

As shown in FIG. 7, suppose that the existence distance in the initial velocity direction at t=0 is 20 km and the operational velocity range of each object is specified as 10 km/s to 11 km/s; the existence distance in the velocity direction after 10 seconds may be determined as 30 km, which is an increase of 10 km from the existence distance in the initial velocity direction, obtained by multiplying 10 seconds by 1 km/s, which is the difference between the maximum and minimum velocities.

Figure 8:
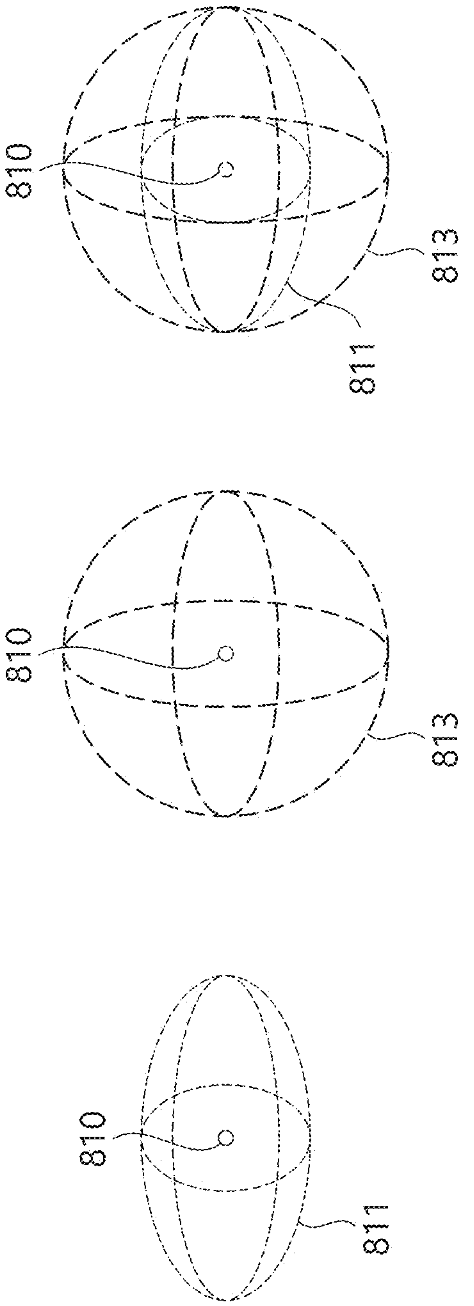
FIG. 8 illustrates a range sphere that includes an existence range.

Through the method above, a time-dependent existence range of a potential intruder may be defined. Meanwhile, all existence ranges may be represented by a range sphere whose volume is always greater than or equal to that of the existence range of the potential intruder. FIG. 8 illustrates a range sphere that includes an existence range. As shown in FIG. 8, for example, an object 810 having an existence range 811 in the ellipsoid shape may be represented by a range sphere 813, where the volume of the sphere is always greater than or equal to that of the existence range 811. The range sphere 813 may represent a spherical existence range with a diameter $D_{sphere}$, which corresponds to the maximum distance $d_{max}$ of the existence range.

Figure 9:
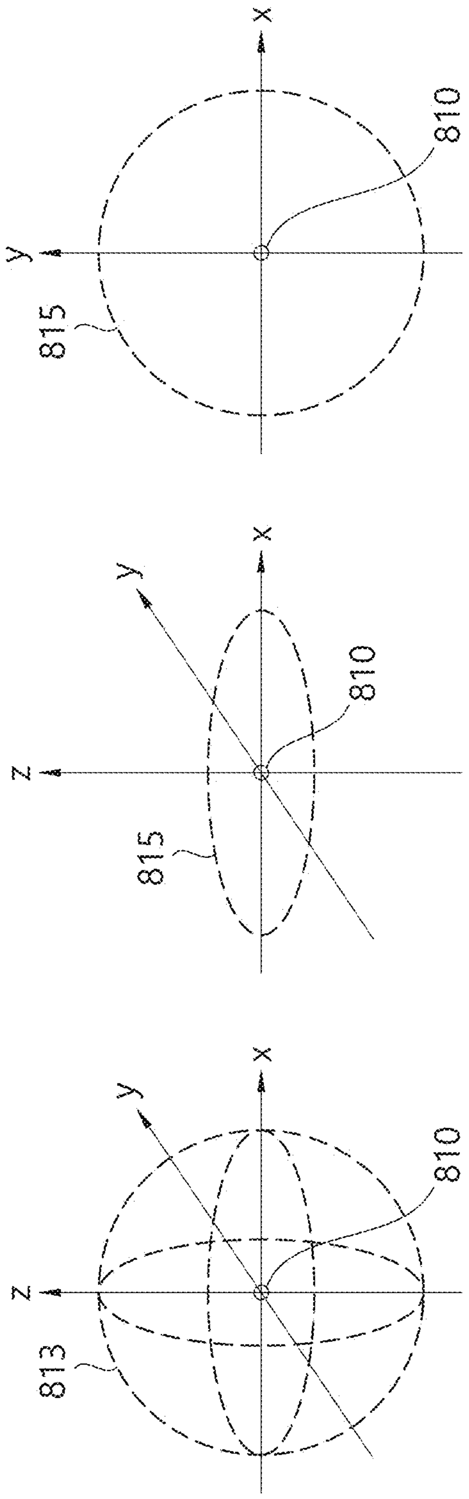
FIG. 9 illustrates a circular range obtained by orthogonal projection of the range sphere of FIG. 8 onto a predetermined plane.

FIG. 9 illustrates a circular range obtained by orthogonal projection of the range sphere of FIG. 8 onto a predetermined plane. According to one aspect of the present disclosure, the range sphere may be represented using a range circle by orthogonally projecting the range sphere onto a predetermined plane aligned with the movement direction. As illustrated in FIG. 9, for an object 810 having a range sphere 813, the existence range may be replaced with a two-dimensional range circle 815 drawn on a single plane, for example, an orthogonal projection onto the xy plane. The representation using the range circle 815 may be applied to moving objects whose movement is confined to a single plane or whose movement perpendicular to the plane is negligible.

Method for Determining a Collision Candidate Object

Figure 10:
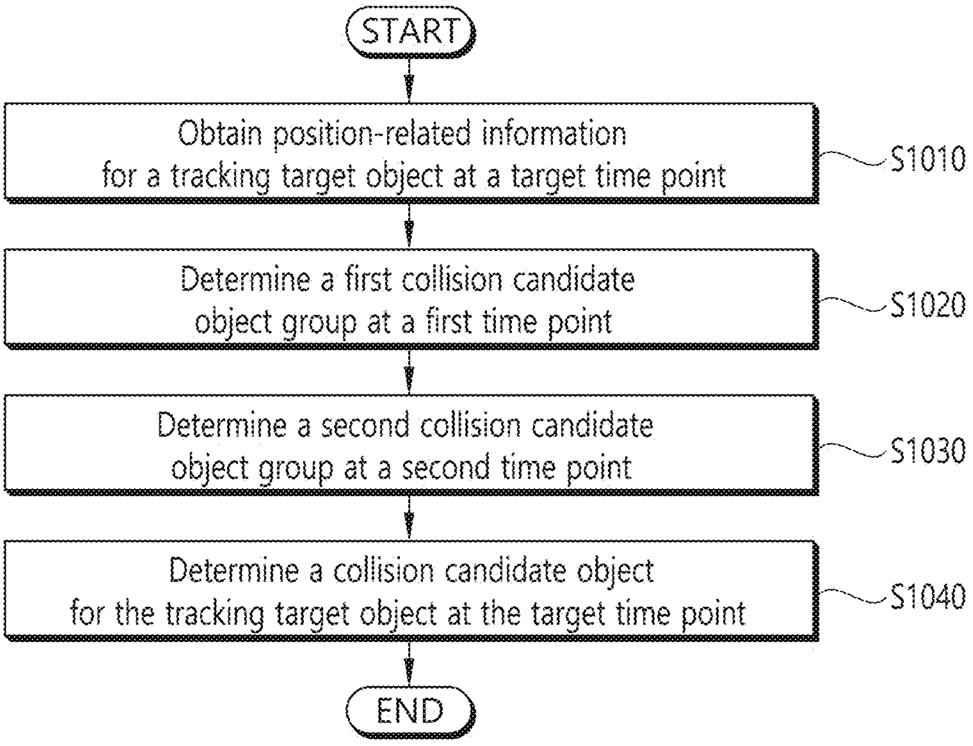
FIG. 10 is a flow diagram illustrating a method for determining a collision candidate object according to one embodiment of the present disclosure.
Figure 11:
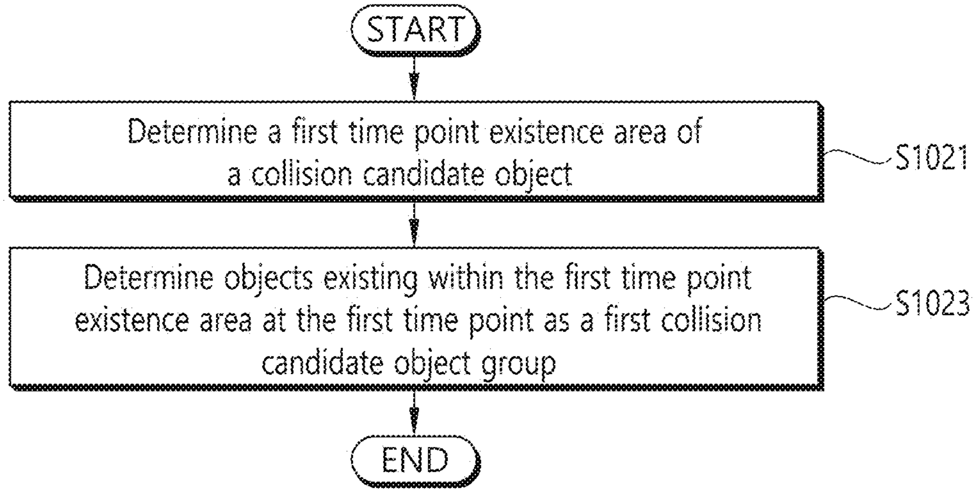
FIG. 11 is a detailed flow diagram illustrating the determining of a first collision candidate object group of FIG. 10.
Figure 12:
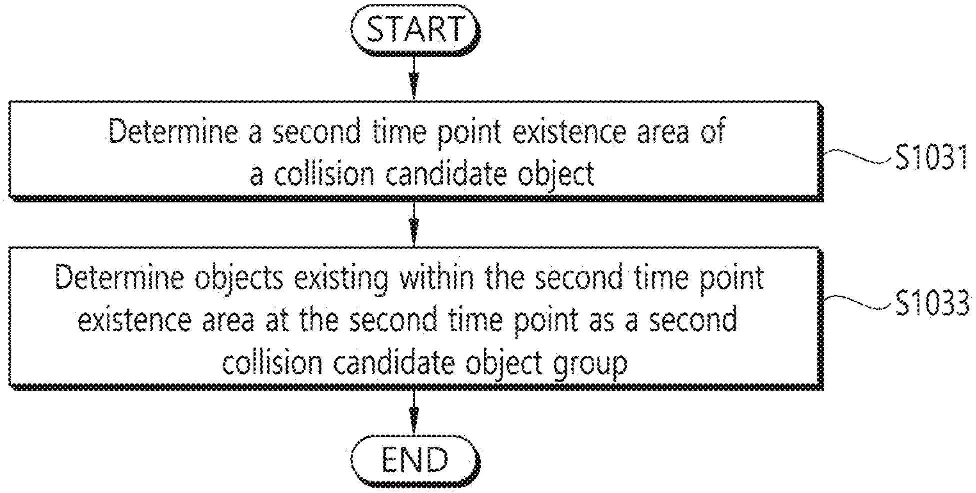
FIG. 12 is a detailed flow diagram illustrating the determining of a second collision candidate object group of FIG. 10.

FIG. 10 is a flow diagram illustrating a method for determining a collision candidate object according to one embodiment of the present disclosure, FIG. 11 is a detailed flow diagram illustrating the determining of a first collision candidate object group of FIG. 10, and FIG. 12 is a detailed flow diagram illustrating the determining of a second collision candidate object group of FIG. 10. In what follows, a method for determining a collision candidate object according to one embodiment of the present disclosure with reference to FIGS. 10 to 12.

As described above, a method for determining a collision candidate object according to one embodiment of the present disclosure enables determining with a high accuracy an object that exhibits a possibility of actual collision based on determining a collision candidate object group for each of a plurality of time points prior to a target time point and determining a common object as an object that has a risk of collision with a tracking target object at the target time point. The method for determining a collision candidate object may be performed by a computing device including a processor and a memory.

As shown in FIG. 10, a method for determining a collision candidate object according to one embodiment of the present disclosure may comprise obtaining position-related information for a tracking target object at a target time point S1010; determining a first collision candidate object group for the tracking target object at the target time point based on position-related information on each of a plurality of objects at a first time point prior to the target time point and position-related information on the tracking target object at the target time point S1020; determining a second collision candidate object group for the tracking target object at the target time point based on position-related information on each of a plurality of objects at a second time point prior to the first time point and position-related information on the tracking target object at the target time point S1030; and determining at least one object included in both the first collision candidate object group and the second collision candidate object group as a collision candidate object for the tracking target object at the target time point S1040.

In other words, an object that may be monitored for the possibility of collision may be referred to as a tracking target object, and objects that have a possibility of collision with a tracking target object at a target time point, which corresponds to one of a plurality of time points, may be determined as collision candidate objects. More specifically, based on information related to a first time point, which is a time point prior to the target time point, objects that may have a possibility of collision with the tracking target object at the target time point may be determined as a first collision candidate object group, and based on information related to a second time point, which is a time point prior to the first time point, objects that may have a possibility of collision with the tracking target object at the target time point may be determined as a second collision candidate object group. Thereafter, an object included in both the first collision candidate object group and the second collision candidate object group may be finally determined as a collision candidate object that has a possibility of collision with the tracking target object at the target time point.

Figure 13:
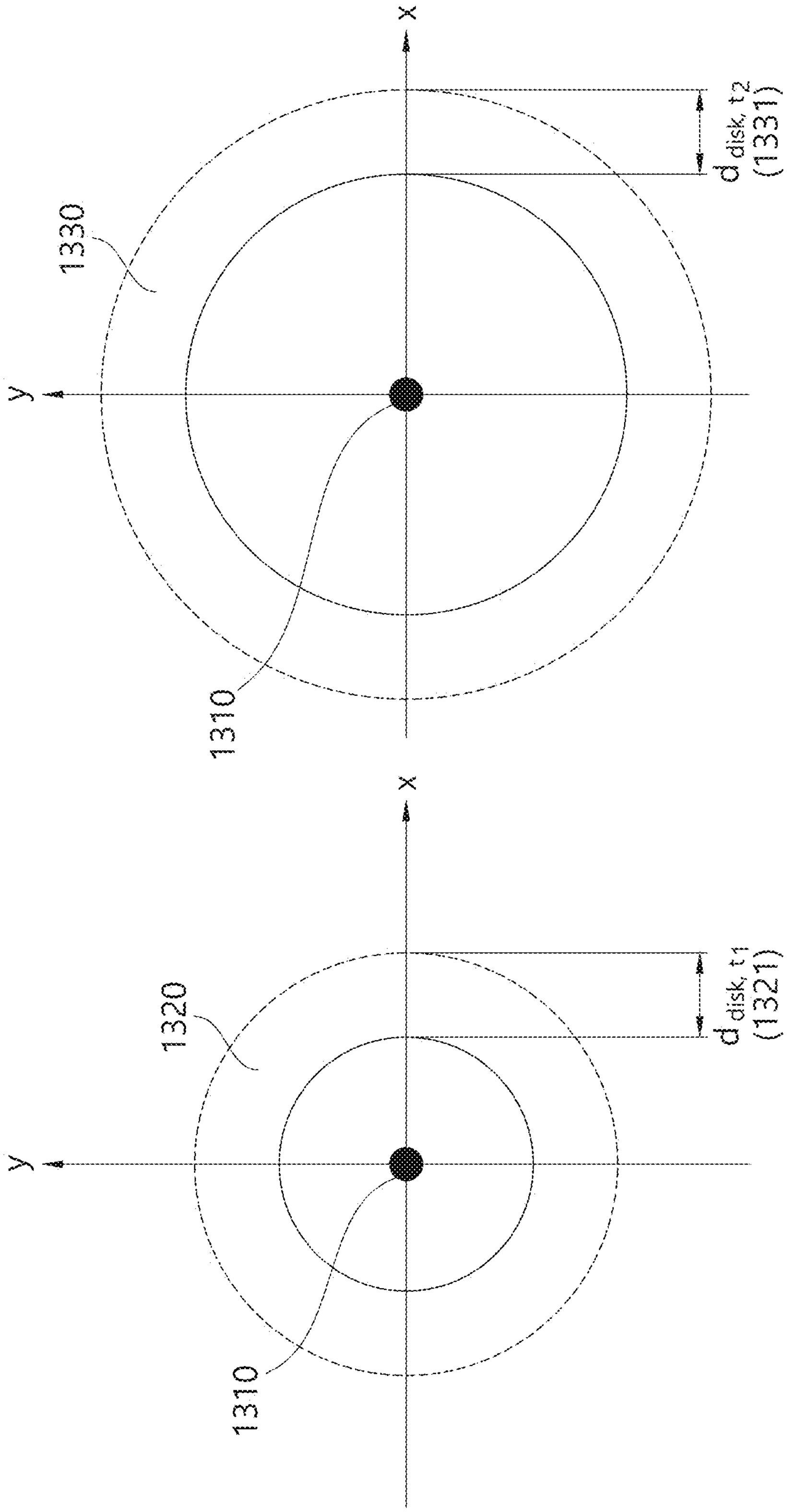
FIG. 13 illustrates an existence area having an annular disk shape.
Figure 14:
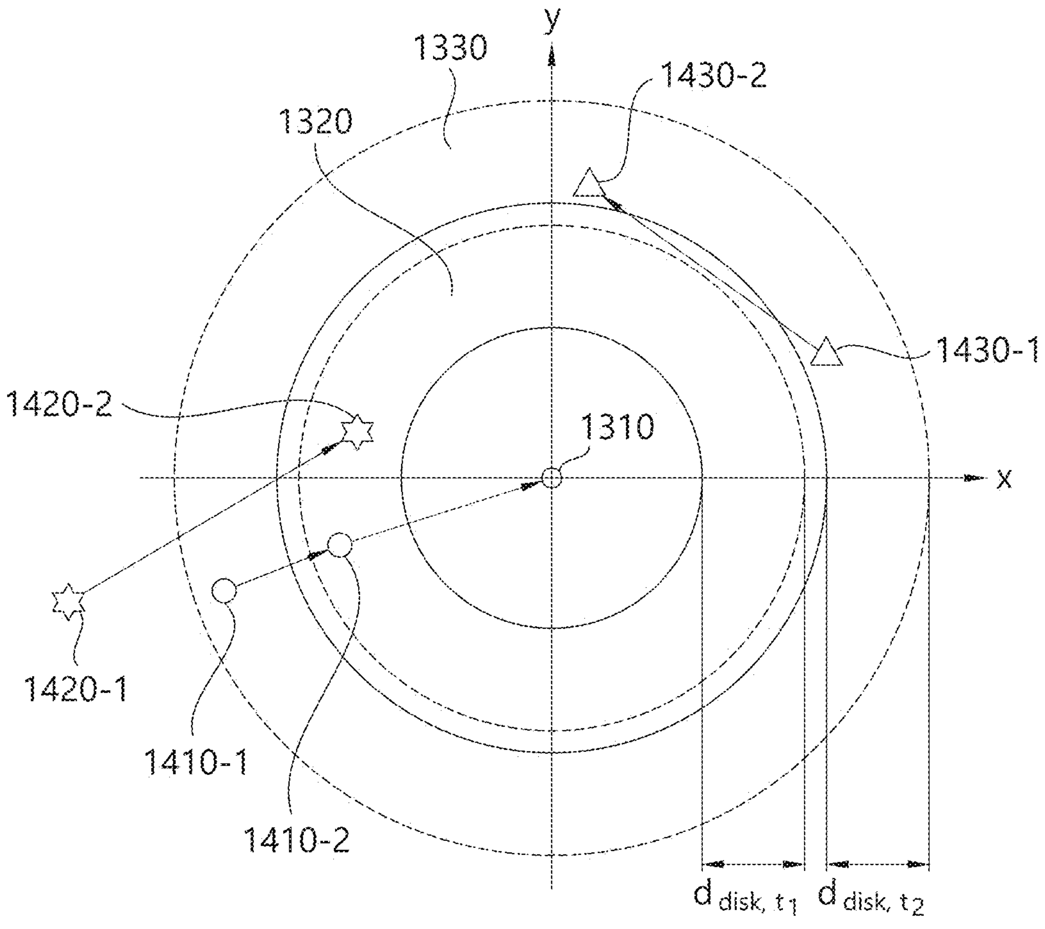
FIG. 14 is a conceptual drawing illustrating determination of a collision candidate object according to the annular disk shape of FIG. 13.

According to one aspect of the present disclosure, whether an object is included in a collision candidate object group may be determined based on setting an existence area with an annular disk shape at a specific time point and determining whether the object exists in the corresponding existence area at the specific time point. In this regard, FIG. 13 illustrates an existence area having an annular disk shape, and FIG. 14 is a conceptual drawing illustrating determination of a collision candidate object according to the annular disk shape of FIG. 13. In what follows, for the convenience of description, a method for determining a collision candidate object according to one aspect of the present disclosure will be described with reference to FIGS. 13 and 14; however, it should be noted that the procedure for determining a collision candidate object group is not limited to using an existence area with an annular disk shape.

Referring back to FIG. 10, a method for determining a collision candidate object according to one embodiment of the present disclosure first obtains position-related information on a tracking target object at a target time point, for example, by a processor of a computing device S1010. For example, as shown in FIG. 13, information on the position of the tracking target object 1310 at the target time point may be acquired. As described above, the accuracy of the estimated position varies depending on the position estimation method or time point, and the tracking target object 1310 may have an existence range. However, as previously illustrated in the present disclosure or as illustrated in FIG. 13, the existence range of the tracking target object 1310 may be merged with each of the other objects, and the tracking target object 1310 may have a reduced existence range that comprises only an estimated position. Meanwhile, the position-related information on the tracking target object acquired may include at least one of position range determination information or velocity information of the tracking target object, where the velocity information may include information on the maximum and minimum velocities.

Referring again to FIG. 10, the processor may determine a first collision candidate object group for the tracking target object at the target time point based on position-related information on each of a plurality of objects at a first time point prior to the target time point and position-related information on the tracking target object at the target time point S1020.

More specifically, FIG. 11 is a detailed flow diagram illustrating the determining of a first collision candidate object group of FIG. 10. As shown in FIG. 11, the processor may first determine the first time point existence area of a collision candidate object for the tracking target object at the target time point S1021. As illustrated in FIG. 13, the first time point existence area 1320 of a collision candidate object for the tracking target object 1310 at the target time point may have, for example, an annular disk shape.

The first time point existence area 1320 may be a set of areas in which an object with a possibility of collision with the tracking target object 1310 at the target time point may be located at the first time point prior to the target time point. For example, the first time point existence area may be determined based on the maximum velocity and the minimum velocity of a plurality of objects that may approach the tracking target object 1310 and the time interval to the first time point. For example, the first time point existence area may be determined based on the position of the tracking target object at the target time point, the maximum velocity and the minimum velocity of the plurality of objects, and the time interval between the target time point and the first time point. More specifically, when an object is to collide with the tracking target object 1310 at the target time point, the position of the object expected to be located at a time point before the target time point by t seconds may be determined by considering the velocity of the object. In the same way as when the velocity of an object is known, the object's position after t seconds may be expected to be located at a position moved from the current position by a distance obtained by multiplying the object's velocity by t seconds, when an object's velocity is known, the object's position before t seconds may be expected to be located at a position separated by a distance obtained by multiplying the object's velocity by t seconds.

Referring to FIG. 13, assuming that the position of an object that may collide with the tracking target object 1310 at the target time point is the position of the tracking target object 1310, it may be expected that the object is located at the inner boundary of the first time point existence area 1320 at the first time point preceding the target time point according to the minimum velocity of the object. Alternatively, it may be expected that the object is located at the outer boundary of the first time point existence area 1320 at the first time point preceding the target time point according to the maximum velocity of the object. Therefore, based on the first time point, the areas including an object that may collide with the tracking target object 1310 at the target time point may be set as the first time point existence area 1320, as illustrated in FIG. 13. The first time point existence area 1320 may be determined to have a predetermined width 1321 extending outward from the center.

Referring again to FIG. 11, after the first time point existence area is determined, the processor may determine objects located within the first time point existence area at the first time point among a plurality of objects as a first collision candidate object group S1023. In this regard, FIG. 14 is a conceptual drawing illustrating determination of a collision candidate object according to the annular disk shape of FIG. 13. As illustrated in FIG. 14, for example, since a circle object 1410-2 at the first time point is located within the first time point existence area 1320, the circle object may be determined as belonging to the first collision candidate object group for the tracking target object 1310 at the target time point. Likewise, since the star object 1420-2 at the first time point is also located within the first time point existence area 1320, the star object may be determined as belonging to the first collision candidate object group for the tracking target object 1310 at the target time point. In contrast, since the triangle object 1430-2 at the first time point is not located within the first time point existence area 1320, the triangle object is not included in the first collision candidate object group.

Referring again to FIG. 10, the processor may determine a second collision candidate object group for the tracking target object at the target time point based on position-related information on each of a plurality of objects at a second time point prior to the first time point and position-related information on the tracking target object at the target time point S1030. In other words, objects that may collide with the tracking target object at the target time point may be determined based on the information related to the second time point and included in the second collision candidate object group.

More specifically, FIG. 12 is a detailed flow diagram illustrating the determining of a second collision candidate object group of FIG. 10. As shown in FIG. 12, the processor may first determine the second time point existence area of a collision candidate object for the tracking target object at the target time point S1031. For example, as shown in FIG. 13, the areas in which objects having a possibility of collision with the tracking target object 1310 at the target time point may be located at the second time point preceding the first time point may be predicted and determined as the second time point existence area 1330. In other words, referring to FIG. 13, assuming that the position of an object that may collide with the tracking target object 1310 at the target time point is the position of the tracking target object 1310, it may be expected that the object is located at the inner boundary of the second time point existence area 1330 at the second time point preceding the first time point, which precedes the target time point, according to the minimum velocity of the object. Alternatively, it may be expected that the object is located at the outer boundary of the second time point existence area 1330 at the second time point preceding the target time point according to the maximum velocity of the object. Therefore, based on the second time point, the areas including an object that may collide with the tracking target object 1310 at the target time point may be set as the second time point existence area 1330, as illustrated in FIG. 13. The second time point existence area 1330 may be determined to have a predetermined width 1331 extending outward from the center.

Referring again to FIG. 12, after the second time point existence area is determined, the processor may determine objects located within the second time point existence area at the second time point among a plurality of objects as a second collision candidate object group S1033. In this regard, FIG. 14 is a conceptual drawing illustrating determination of a collision candidate object according to the annular disk shape of FIG. 13. As illustrated in FIG. 14, for example, since a circle object 1410-1 at the second time point is located within the second time point existence area 1330, the circle object may be determined as belonging to the second collision candidate object group for the tracking target object 1310 at the target time point. Likewise, since the triangle object 1430-1 at the second time point is also located within the second time point existence area 1330, the triangle object may be determined as belonging to the second collision candidate object group for the tracking target object 1310 at the target time point. In contrast, since the star object 1420-1 at the second time point is not located within the second time point existence area 1330, the triangle object is not included in the second collision candidate object group.

Referring again to FIG. 10, the processor may determine at least one object included in both the first collision candidate object group and the second collision candidate object group as a collision candidate object for the tracking target object at the target time point S1040. In other words, rather than determining a collision candidate object based on either the first time point or the second time point, an object included not only in the first collision candidate object group at the first time point but also in the second collision candidate object group at the second time point may be finally determined as the collision candidate object that is expected to collide with the tracking target object at the target time point.

As shown in FIG. 14, since the circle object 1410-1 at the second time point is located in the second time point existence area, and the circle object 1410-2 at the first time point is located in the first time point existence area, the circle object may be determined as the collision candidate object expected to collide with the tracking target object 1310 at the target time point. In other words, the circle object, which is expected to approach the tracking target object 1310 as time progresses from the second time point to the first time point and then to the target time point, may be expected to collide with the tracking target object 1310 at the target time point.

On the other hand, although the triangle object 1430-1 at the second time point is located in the second time point existence area, the triangle object 1430-2 at the first time point is not located in the first time point existence area; therefore, the triangle object may not be expected to approach and collide with the tracking target object 1310 at the target time point. In the case of the star object, although the star object 1420-2 at the first time point is located in the first time point existence area, the star object 1420-1 at the second time point is not located in the second time point existence area; therefore, the star object may not be expected to approach and collide with the tracking target object 1310 at the target time point.

As described above, by determining an object that belongs to both the first time point existence area and the second time point existence area as a collision candidate object, collision candidate objects may be determined more accurately. For example, if the star object or the triangle object illustrated in FIG. 14 is determined as a collision candidate object by setting the existence area only for one time point, the star or triangle object may be incorrectly determined as a collision candidate object regardless of its low likelihood of colliding with the tracking target object 1310. Accordingly, the number of objects requiring intensive monitoring increases, thereby unnecessarily wasting human or physical resources.

Figure 15:
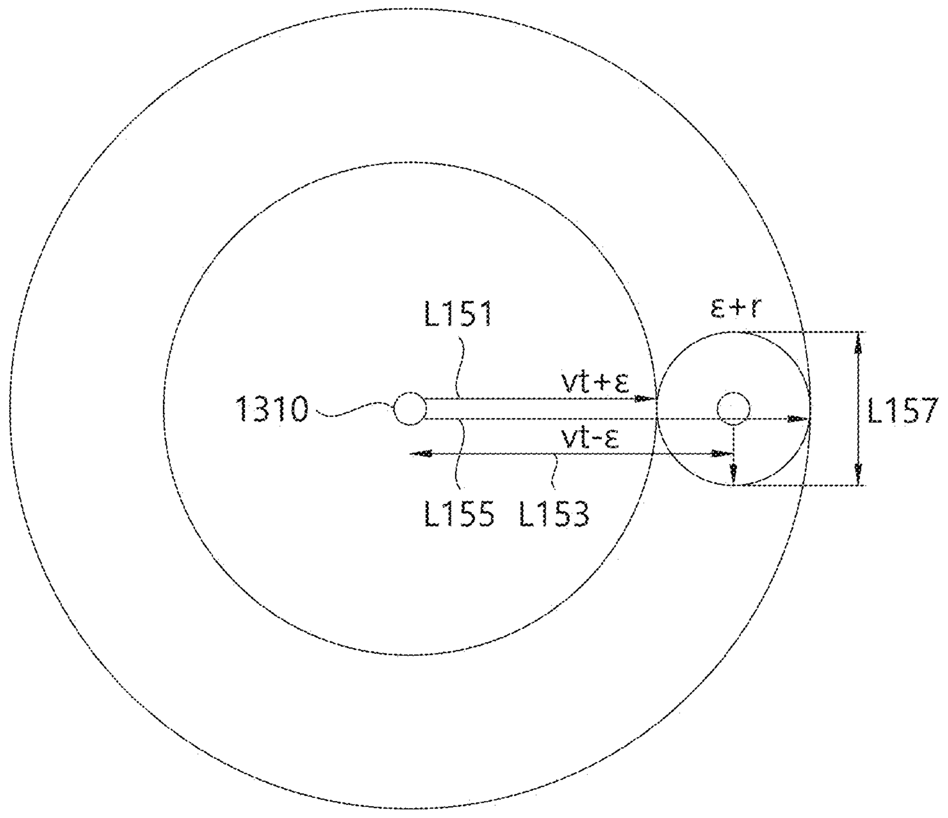
FIG. 15 illustrates the diameter and thickness of an existence range at a previous time point.

Meanwhile, the setting of existence areas is described in more detail below. In relation to the description above, FIG. 15 illustrates the diameter and thickness of an existence range at a previous time point. More specifically, referring to FIGS. 13 and 15, according to one aspect of the present disclosure, the first time point existence area 1320 may have a two-dimensional annular disk shape, centered at the position 1310 of the tracking target object at the target time point, having a diameter L153 determined according to the maximum velocity and the minimum velocity of an object that may approach the tracking target object and the time interval between the target time point and the first time point, having a second width L157 in the direction toward the center, and being included within a predetermined plane. The diameter L151 of the inner circle of the first time point existence area 1320 may be determined as a separation distance expected based on the minimum velocity of an object that may approach the tracking target object. The diameter L155 of the outer circle of the first time point existence area 1320 may be determined as a separation distance expected based on the maximum velocity of an object that may approach the tracking target object. The diameter L153 of the first time point existence area 1320 may represent the distance from the position of the tracking target object 1310 at the target time point to the center point of the thickness of the first time point existence area 1320. The diameter L153 may be determined, for example, by multiplying the average velocity of the maximum velocity and the minimum velocity of objects that may approach the tracking target object 1310 by the time interval between the target time point and the first time point.

Figure 16:
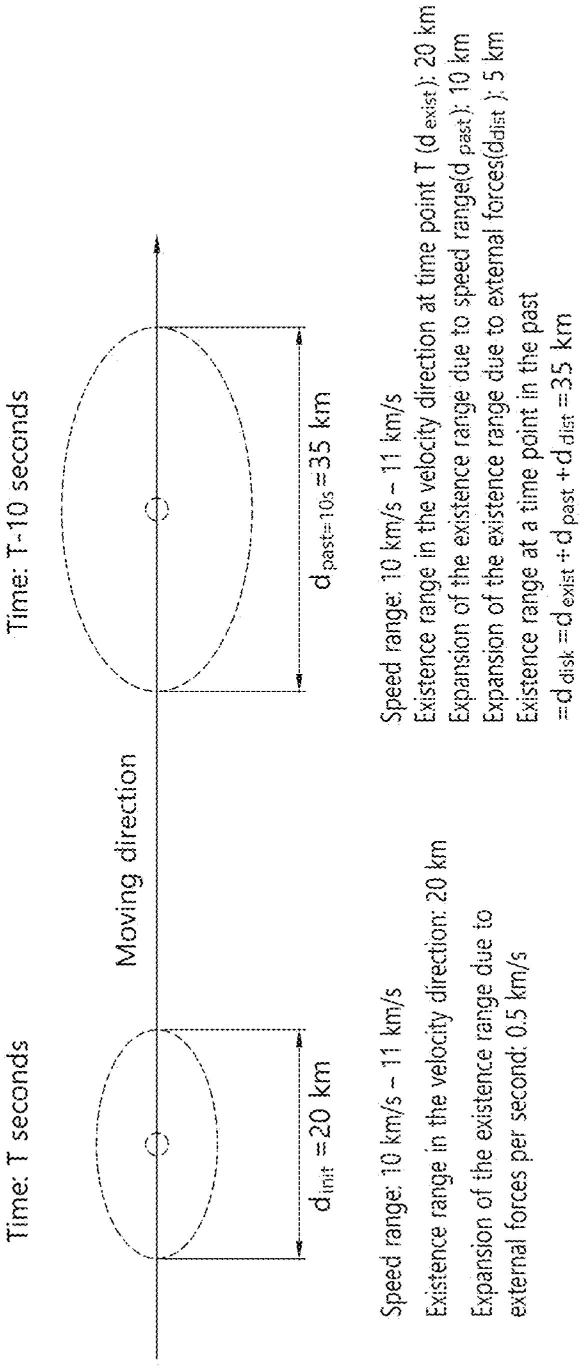
FIG. 16 illustrates a procedure of determining the thickness of an exemplary existence range.

According to one aspect of the present disclosure, an additional factor may be considered in addition to the maximum and minimum velocities of objects that may approach the tracking target object in determining the width and the thickness of the existence area. FIG. 16 illustrates a procedure of determining the thickness of an exemplary existence range. According to one aspect of the present disclosure, the thickness of the existence area may be determined based on the existence range of a plurality of objects at the target time point; the existence range increasing according to the maximum velocity, minimum velocity, and time interval between the target time point and the first time point; and the existence range increasing according to at least one of a gravitational force or an external force.

For example, as illustrated in FIG. 16, the existence range in the velocity direction of an object at T seconds may be 20 km, and the corresponding object may have a speed range of 10 km/s to 11 km/s. Also, the existence range of the object may be affected by an external force, and the expansion of the existence range due to the external force per second may be determined to be 0.5 km/s. In this situation, first, the existence range of the object at T-10 seconds prior to T seconds includes the existence range of 20 km in the velocity direction $d_{exist}$ at time point T without a modification; however, since the existence range has a velocity range, the expansion of the existence range due to the velocity range $d_{past}$ of 10 km has to be further considered. In other words, since the difference between the maximum velocity and the minimum velocity is 1 km/s, the existence range expands by 10 km during 10 seconds. In addition, since the expansion $d_{dist}$ of the existence range occurs due to an external force of 0.5 km/s per second, the expansion of the existence range due to an external force applied 10 seconds ago becomes 0.5*10=5 km. Therefore, the existence range of the object in the velocity direction $d_{disk}$ at a previous time point 10 seconds before time point T may be determined as 35 km, which is the sum of $d_{exist}$, $d_{past}$, and $d_{dist}$. Using the existence range at a previous time point, for example, the thickness of the existence area at the first time point before time point T may be determined to be the existence range at the previous time point determined as above.

In relation to the description above, according to one aspect, since it is possible to determine the existence range for each of a plurality of objects that may approach the tracking target object 1310, the existence range of each of the plurality of objects may be utilized for determining the past existence range and the thickness of the existence area. In this case, the first time point existence area for each of the plurality of objects may be different from each other. According to one aspect of the present disclosure, to simplify the operations, the same first time point existence area may be set for all objects based on the existence range of the object with the largest existence range at the target time point among the plurality of objects, or the same first time point existence area may be set for all objects based on the existence range of the tracking target object 1310 at the target time point.

In a similar manner to the first time point existence area, the second time point existence area may be determined based on the position of the tracking target object at the target time point, the maximum velocity and minimum velocity of the plurality of objects, and the time interval between the target time point and the second time point. Furthermore, the specifics regarding the determination of the first time point existence area described above may be applied also to the determination of the second time point existence area.

Meanwhile, as described with reference to FIGS. 13 to 16, the existence area at a specific time point according to one aspect of the present disclosure may have a two-dimensional annular disk shape. This two-dimensional annular disk shape may be suitable for a moving object that exhibits no or negligible motion in the vertical direction, such as at least one of a ship or an autonomous driving vehicle. Accordingly, the existence area at a specific time point according to one aspect of the present disclosure may be determined as a two-dimensional annular disk shape for at least one of a ship or an autonomous driving vehicle.

In the above, the present disclosure describes the case where the existence area has a two-dimensional annular disk shape; however, according to another embodiment of the present disclosure, the existence area may be set as a three-dimensional spherical shell shape.

Figure 17:
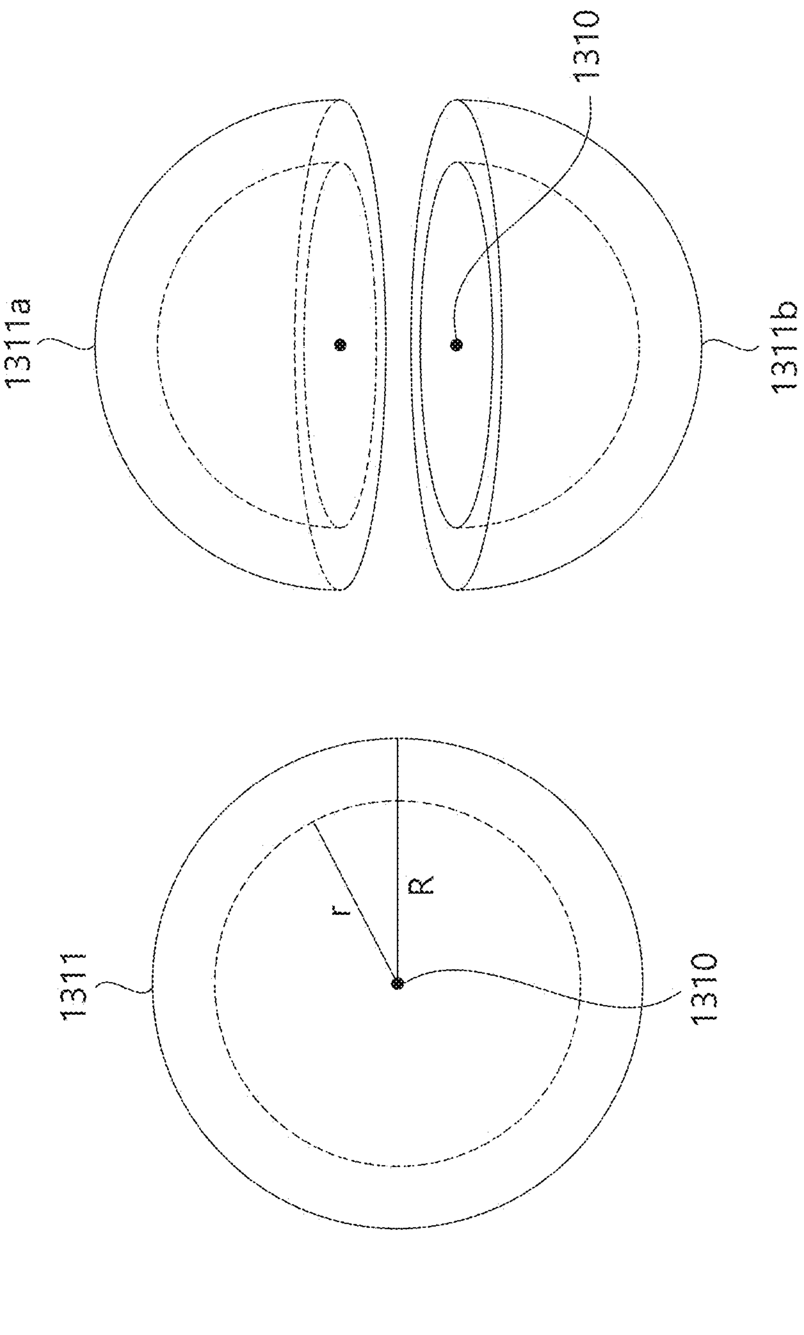
FIG. 17 is a conceptual drawing of an existence area having a spherical shell shape.

FIG. 17 is a conceptual drawing of an existence area having a spherical shell shape. As illustrated in FIG. 17, according to one aspect of the present description, whether an object is included in a collision candidate object group may be determined by setting an existence area with a spherical shell shape at a specific time point and examining whether the object exists in the existence area at the specific time point. In other words, the existence area of an object included in the collision candidate object group at a specific time point may have, for example, a spherical shell shape. As illustrated in FIG. 17, the existence area 1311 with a spherical shell shape may be centered at the tracking target object 1310 and have an inner diameter r estimated based on the lowest velocity and an outer diameter R estimated based on the highest velocity. For the convenience of description or to ensure visibility, the existence area 1311 in a spherical shell shape is divided into a first area 1311*a* and a second area 1311*b*; in what follows, the present disclosure is described using the second area 1311*b* as an example and explained below. However, it should be noted that the existence area in a spherical shell shape according to the present disclosure is not limited to a hemispherical shell shape, such as the second area.

Figure 18:
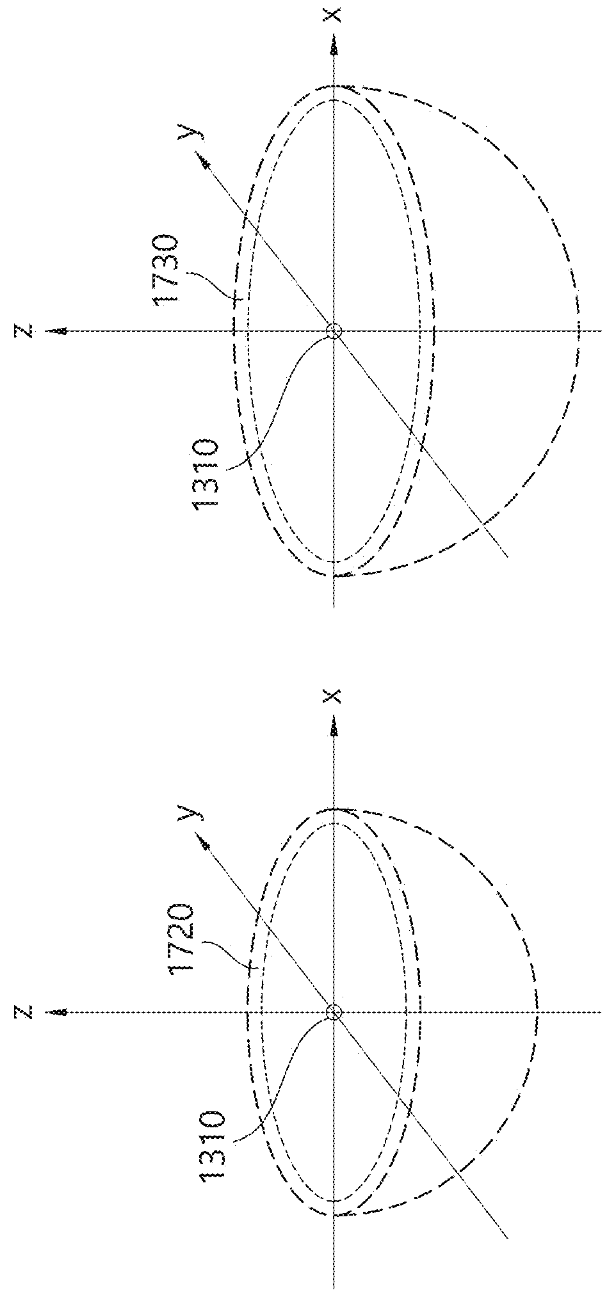
FIG. 18 illustrates an existence area having a spherical shell shape.
Figure 19:
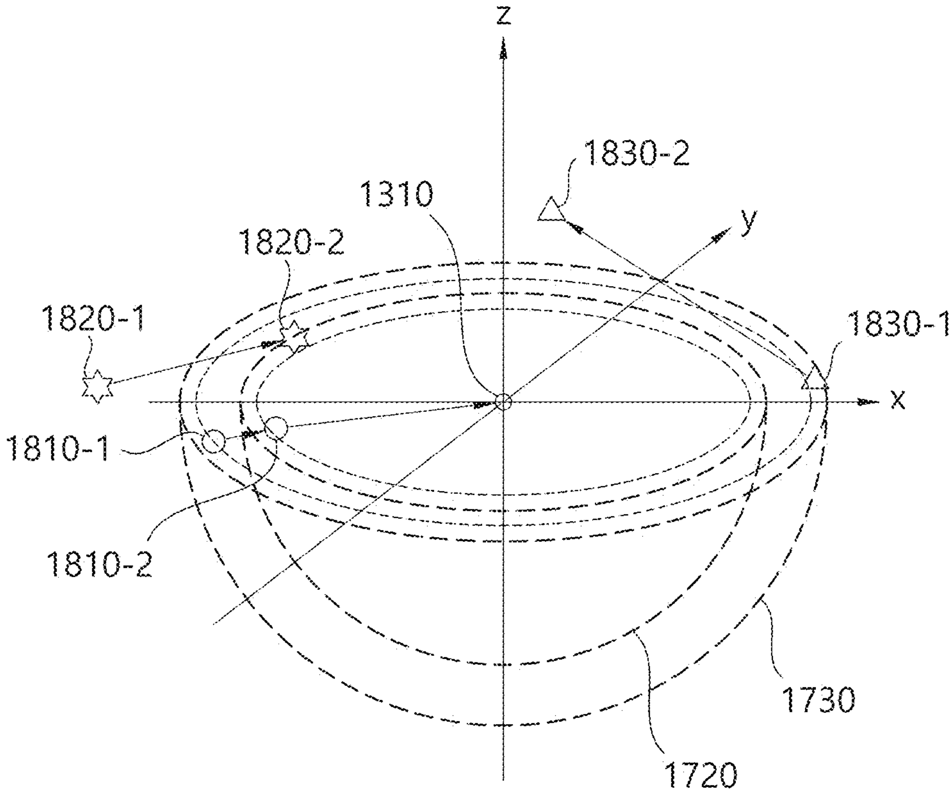
FIG. 19 is a conceptual drawing illustrating the determining of a collision candidate object according to the spherical shell shape of FIG. 18.

In relation to the description above, FIG. 18 illustrates an existence area having a spherical shell shape, and FIG. 19 is a conceptual drawing illustrating the determining of a collision candidate object according to the spherical shell shape of FIG. 18.

The first time point existence area 1720 may be a set of areas in which an object with a possibility of collision with the tracking target object 1310 at the target time point may be located at the first time point prior to the target time point. For example, the first time point existence area may be determined based on the maximum velocity and the minimum velocity of a plurality of objects that may approach the tracking target object 1310 and the time interval to the first time point. For example, the first time point existence area may be determined based on the position of the tracking target object at the target time point, the maximum velocity and the minimum velocity of the plurality of objects, and the time interval between the target time point and the first time point. More specifically, when an object is to collide with the tracking target object 1310 at the target time point, the position of the object expected to be located at a time point before the target time point by t seconds may be determined by considering the velocity of the object. In the same way as when the velocity of an object is known, the object's position after t seconds may be expected to be located at a position moved from the current position by a distance obtained by multiplying the object's velocity by t seconds, when an object's velocity is known, the object's position before t seconds may be expected to be located at a position separated by a distance obtained by multiplying the object's velocity by t seconds.

Referring to FIG. 18, assuming that the position of an object that may collide with the tracking target object 1310 at the target time point is the position of the tracking target object 1310, it may be expected that the object is located at the inner boundary of the first time point existence area 1320 at the first time point preceding the target time point according to the minimum velocity of the object. Alternatively, it may be expected that the object is located at the outer boundary of the first time point existence area 1320 at the first time point preceding the target time point according to the maximum velocity of the object. Therefore, based on the first time point, the areas including an object that may collide with the tracking target object 1310 at the target time point may be set as the first time point existence area 1720, as illustrated in FIG. 18. In the same way, based on the second time point, the areas including an object that may collide with the tracking target object 1310 at the target time point may be set as the second time point existence area 1730, as illustrated in FIG. 18.

In this regard, FIG. 19 is a conceptual drawing illustrating the determining of a collision candidate object according to the spherical shell shape of FIG. 18. As illustrated in FIG. 19, for example, since a circle object 1810-2 at the first time point is located within the first time point existence area 1820, the circle object may be determined as belonging to the first collision candidate object group for the tracking target object 1310 at the target time point. Likewise, since the star object 1820-2 at the first time point is also located within the first time point existence area 1820, the star object may be determined as belonging to the first collision candidate object group for the tracking target object 1310 at the target time point. In contrast, since the triangle object 1830-2 at the first time point is not located within the first time point existence area 1820, the triangle object is not included in the first collision candidate object group.

For example, as shown in FIG. 18, the areas in which objects having a possibility of collision with the tracking target object 1310 at the target time point may be located at the second time point preceding the first time point may be predicted and determined as the second time point existence area 1730. In other words, referring to FIG. 18, assuming that the position of an object that may collide with the tracking target object 1310 at the target time point is the position of the tracking target object 1310, it may be expected that the object is located at the inner boundary of the second time point existence area 1730 at the second time point preceding the first time point, which precedes the target time point, according to the minimum velocity of the object. Alternatively, it may be expected that the object is located at the outer boundary of the second time point existence area 1730 at the second time point preceding the target time point according to the maximum velocity of the object. Therefore, based on the second time point, the areas including an object that may collide with the tracking target object 1310 at the target time point may be set as the second time point existence area 1730, as illustrated in FIG. 18.

Subsequently, the second collision candidate object group may be determined. As illustrated in FIG. 19, for example, since a circle object 1810-1 at the second time point is located within the second time point existence area 1730, the circle object may be determined as belonging to the second collision candidate object group for the tracking target object 1310 at the target time point. Likewise, since the triangle object 1830-1 at the second time point is also located within the second time point existence area 1730, the triangle object may be determined as belonging to the second collision candidate object group for the tracking target object 1310 at the target time point. In contrast, since the star object 1820-1 at the second time point is not located within the second time point existence area 1730, the triangle object is not included in the second collision candidate object group.

Next, at least one object included in both the first collision candidate object group and the second collision candidate object group may be determined as a collision candidate object for the tracking target object at the target time point. As shown in FIG. 19, since the circle object 1810-1 at the second time point is located in the second time point existence area, and the circle object 1810-2 at the first time point is located in the first time point existence area, the circle object may be determined as the collision candidate object expected to collide with the tracking target object 1310 at the target time point. In other words, the circle object, which is expected to approach the tracking target object 1310 as time progresses from the second time point to the first time point and then to the target time point, may be expected to collide with the tracking target object 1310 at the target time point.

On the other hand, although the triangle object 1830-1 at the second time point is located in the second time point existence area, the triangle object 1830-2 at the first time point is not located in the first time point existence area; therefore, the triangle object may not be expected to approach and collide with the tracking target object 1310 at the target time point. In the case of the star object, although the star object 1820-2 at the first time point is located in the first time point existence area, the star object 1820-1 at the second time point is not located in the second time point existence area; therefore, the star object may not be expected to approach and collide with the tracking target object 1310 at the target time point. As described above, by determining an object that belongs to both the first time point existence area and the second time point existence area as a collision candidate object, collision candidate objects may be determined more accurately.

Figure 20:
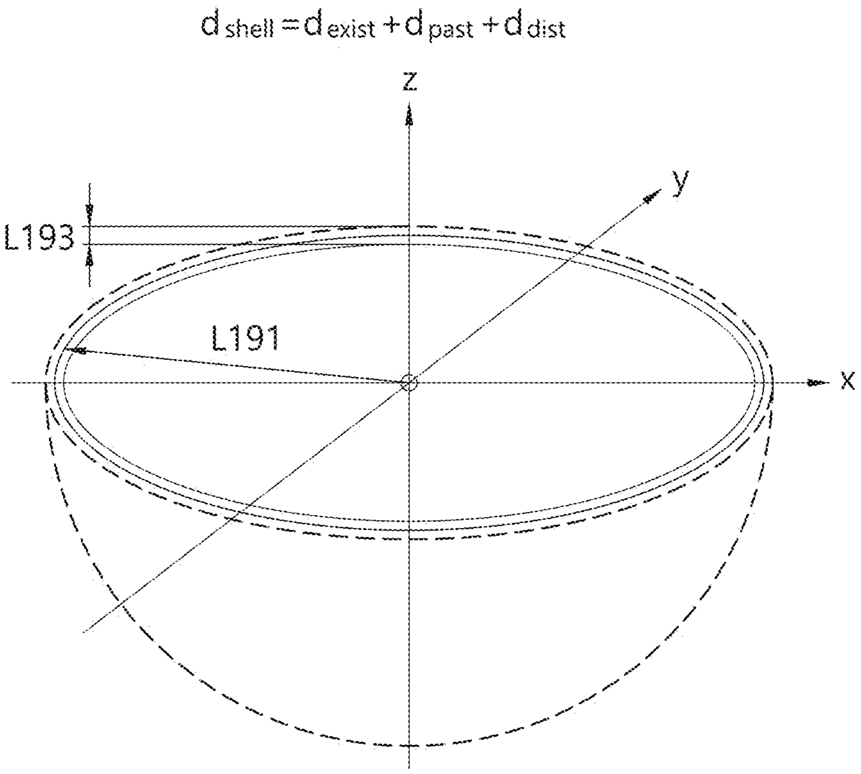
FIG. 20 illustrates the diameter and thickness of an existence range at a previous time point.

Meanwhile, in what follows, the setting of existence areas having a spherical shell shape is described in more detail below. In relation to the description above, FIG. 20 illustrates the diameter and thickness of an existence range at a previous time point. More specifically, referring to FIG. 20, according to one aspect of the present disclosure, the existence area at a specific time point before the target time point may have a three-dimensional spherical shell shape, centered at the position 1310 of the tracking target object at the target time point, having a diameter L191 determined according to the maximum velocity and the minimum velocity of an object that may approach the tracking target object and the time interval between the target time point and the first time point, and having a second width L193 in the direction toward the center. The diameter L153 may be determined, for example, by multiplying the average velocity of the maximum velocity and the minimum velocity of objects that may approach the tracking target object 1310 by the time interval between the target time point and the first time point.

Figure 21:
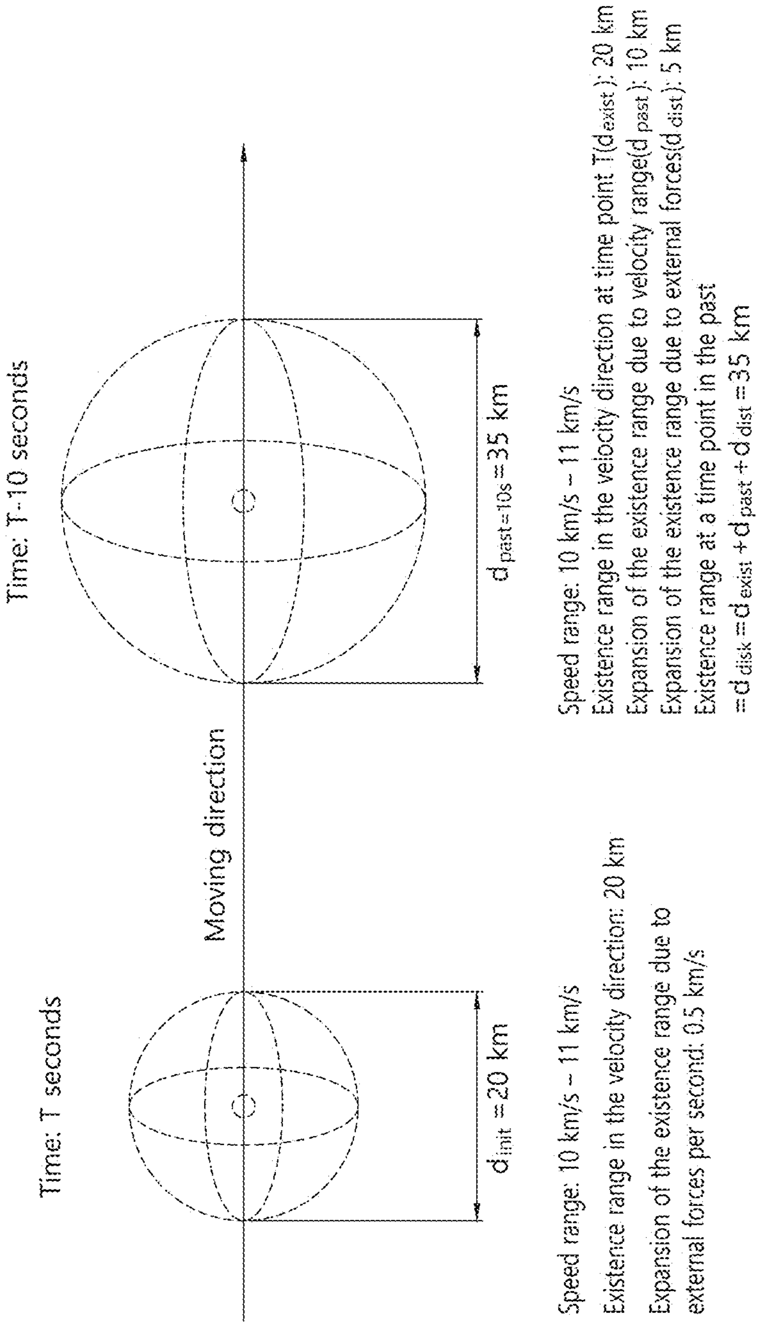
FIG. 21 illustrates a procedure of determining the thickness of an exemplary existence range.

According to one aspect of the present disclosure, an additional factor may be considered in addition to the maximum and minimum velocities of objects that may approach the tracking target object in determining the width and the thickness of the existence area. FIG. 21 illustrates a procedure of determining the thickness of an exemplary existence range. According to one aspect of the present disclosure, the thickness of the existence area may be determined based on the existence range of a plurality of objects at the target time point; the existence range increasing according to the maximum velocity, minimum velocity, and time interval between the target time point and the first time point; and the existence range increasing according to at least one of a gravitational force or an external force.

For example, as illustrated in FIG. 21, the existence range in the velocity direction of an object at T seconds may be 20 km, and the corresponding object may have a velocity range of 10 km/s to 11 km/s. Also, the existence range of the object may be affected by an external force, and the expansion of the existence range due to the external force per second may be determined to be 0.5 km/s. In this situation, first, the existence range of the object at T-10 seconds prior to T seconds includes the existence range of 20 km in the velocity direction $d_{exist}$ at time point T without a modification; however, since the existence range has a velocity range, the expansion of the existence range due to the velocity range $d_{past}$ of 10 km has to be further considered. In other words, since the difference between the maximum velocity and the minimum velocity is 1 km/s, the existence range expands by 10 km during 10 seconds. In addition, since the expansion $d_{dist}$ of the existence range occurs due to an external force of 0.5 km/s per second, the expansion of the existence range due to an external force applied 10 seconds ago becomes 0.5*10=5 km. Therefore, the existence range of the object in the velocity direction $d_{disk}$ at a previous time point 10 seconds before time point T may be determined as 35 km, which is the sum of $d_{exist}$, $d_{past}$, and $d_{dist}$. Using the existence range at a previous time point, for example, the thickness of the existence area at the first time point before time point T may be determined to be the existence range at the previous time point determined as above.

In relation to the description above, according to one aspect, since it is possible to determine the existence range for each of a plurality of objects that may approach the tracking target object 1310, the existence range of each of the plurality of objects may be utilized for determining the past existence range and the thickness of the existence area. In this case, the first time point existence area for each of the plurality of objects may be different from each other. According to one aspect of the present disclosure, to simplify the operations, the same first time point existence area may be set for all objects based on the existence range of the object with the largest existence range at the target time point among the plurality of objects, or the same first time point existence area may be set for all objects based on the existence range of the tracking target object 1310 at the target time point.

In a similar manner to the first time point existence area, the second time point existence area may be determined based on the position of the tracking target object at the target time point, the maximum velocity and minimum velocity of the plurality of objects, and the time interval between the target time point and the second time point. Furthermore, the specifics regarding the determination of the first time point existence area described above may be applied also to the determination of the second time point existence area.

Meanwhile, as described with reference to FIGS. 17 to 21, the existence area at a specific time point according to one aspect of the present disclosure may have a three-dimensional spherical shell shape. This three-dimensional spherical shell shape may be suitable for a moving object that exhibits motion not only within a plane but also in the vertical direction, such as at least one of an unmanned aerial vehicle or a drone. Accordingly, the existence area at a specific time point according to one aspect of the present disclosure may be determined as a three-dimensional spherical shell shape for at least one of an unmanned aerial vehicle or a drone.

Method for Determining a Collision Candidate Object for Space Objects

Figure 23:
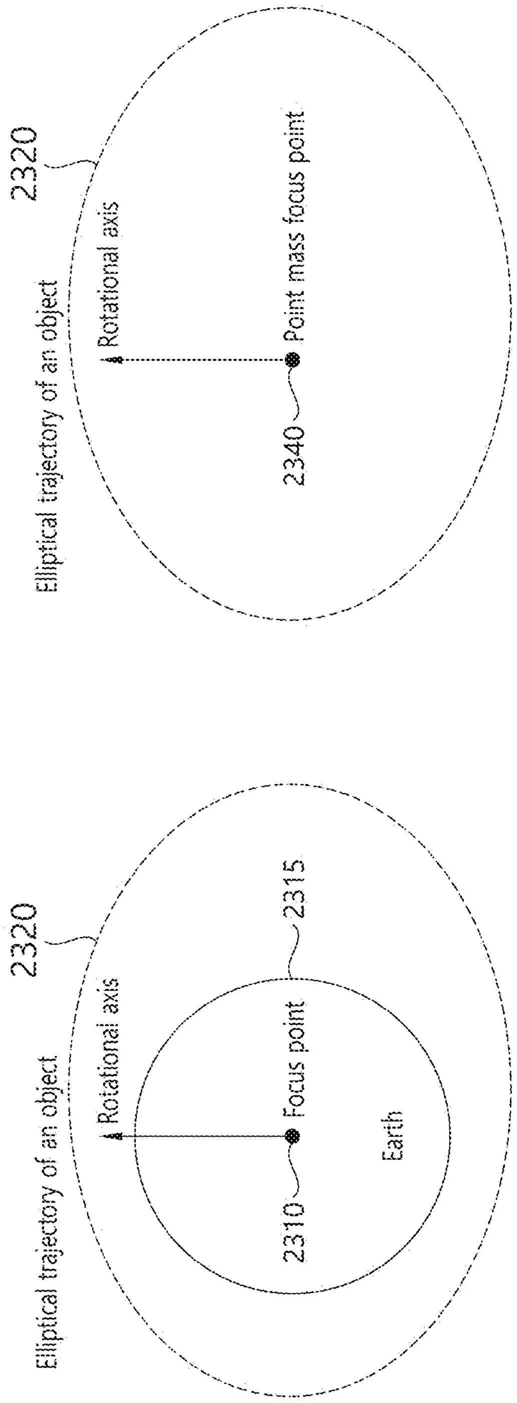
FIG. 23 illustrates the orbits of the volumetric Earth and the point mass Earth.

Meanwhile, among various moving objects, there may be space objects that move along an elliptical orbit around a specific point, such as satellites that move along an elliptical orbit around the Earth. A method for determining a collision candidate object according to another embodiment of the present disclosure may be applied to the objects following such an elliptical orbit. The method according to the embodiment may be applied to a situation in which, when the inhomogeneous gravitational field and external forces experienced by a space object are expressed as the homogeneous point mass gravitational field and external forces, the point mass gravitational field is relatively more dominant than the external forces generated by the inhomogeneous gravitational field as well as the external forces generated by the environment in which the space object exists. In relation to the description above, FIG. 23 illustrates the orbits of the volumetric Earth and the point mass Earth. As illustrated on the left of FIG. 23, the elliptical trajectory 2320 of an object may be described relative to a specific reference point of the Earth 2315, for example, the focus point 2310, which is the midpoint of the Earth. A large gravitational field such as the Earth may be expressed by a homogeneous point mass gravitational field, which may be expressed as an elliptical trajectory 2320 relative to the point mass focus 2340, as illustrated on the right of FIG. 23. In this way, a relatively large gravitational field that generates an elliptical orbital movement of an object may be expressed by a specific homogeneous point mass gravitational field; at this time, since the gravitational field such as the Earth is relatively dominant over other inhomogeneous gravitational fields or other external forces exerted on a moving object moving along an elliptical trajectory, the object may continue to move along the elliptical orbit. The trajectory of a space object due to a point mass gravitational field forms a conic section, while resulting in an elliptical trajectory when the eccentricity is 1 or less. Space objects considered in the collision candidate group search algorithm according to the embodiments of the present disclosure may include any objects that follow an elliptical trajectory due to a point mass gravitational field.

In the embodiments related to a method for determining a collision candidate object for objects moving along an elliptical orbit, a 'tracking target object' may refer to an object used as a reference for determining the presence of another object with a risk of collision. In other words, a method for determining a collision candidate object according to embodiments of the present disclosure may select a candidate object with a possibility of colliding with a 'tracking target object' at each time point of at least one or more target time points. In other words, the 'tracking target object' may also be referred to as a 'subject.'

The 'target time point' may be a reference time point for determining the possibility of collision between the tracking target object and a collision candidate object. According to one aspect of the present disclosure, by determining collision candidate objects at a plurality of target time points arranged in a time series, collision candidate objects may be determined and monitored at each time point within a predetermined time interval.

In the embodiments of the present disclosure, 'position-related information' may be acquired for each object, including the tracking target object. The position-related information may be understood as a concept that includes information on the movement of an object, such as the range of position or velocity of the corresponding object at each time point. For example, at least one of the trajectory, position error, velocity range, velocity error, and size information described above may be included in the position-related information.

According to one aspect, the position-related information corresponding to at least one object among the tracking target object or the plurality of objects being assessed for the possibility of collision may include at least one of position range determination information or velocity information for the object corresponding to the position-related information.

Here, the 'position range determination information' may include at least one of position estimation information or position error information for an object corresponding to the position-related information. In other words, the position range determination information may include an estimate of the position of the target object at the corresponding time point and information on the accuracy of the estimate.

In this regard, as described with reference to FIG. 1 for an ordinary object, all kinds of space objects reveal a position error, which may be expressed by defining the existence range of the object as a three-dimensional volume. In other words, an existence range of an object is defined as a three-dimensional volume. All kinds of moving objects exhibit an error in their position estimate, and the error may be expressed by defining the existence range of the moving object as a three-dimensional volume.

To determine a collision candidate object, a criterion is required as to whether to determine a particular object as a collision candidate object for the tracking target object. In this regard, various definitions may be applied to describe the meaning of 'collision'; however, according to one non-restrictive aspect of the present disclosure, for example, an object of which the existence range at the target time point is expected to include the position of the tracking target object may be determined as a collision candidate object.

More generally, an object that has a probability or possibility of colliding with a tracking target object at a target time point may be determined as a collision candidate object. Here, the collision probability may be expressed by, for example, the extend of overlap between the existence ranges of two objects. FIG. 2 illustrates a situation in which existence ranges of a plurality of objects overlap with each other. As illustrated in FIG. 2, the existence range 21 of the first object 20 and the existence range 31 of the second object 30 have an overlapping region 41. According to one aspect, the first object 20 and the second object 30, which have the overlapping region 41 within their respective existence ranges, may be understood as having a possibility of collision with each other. Also, according to one aspect, it is also possible to define the collision probability based on, for example, the volume of the overlapping region 41; however, it should be noted that technical principles of the present disclosure is not limited to the specific description. According to one aspect, an object with a collision probability exceeding a predetermined threshold may also be determined as a collision candidate object for the tracking target object.

Meanwhile, a method according to an embodiment of the present disclosure may be applied to a moving object following an elliptical orbit. However, since a space object is affected by one or more of an inhomogeneous gravitational field or an external force, the motion of the space object may form a perfect elliptical trajectory. In this regard, according to one aspect of the present disclosure, the existence range of an object may be defined to further include, in addition to the existence range due to the position estimation information and the position error of the object, the maximum separation distance deviated by at least one of the inhomogeneous gravitational field or an external force from the elliptical orbit due to the gravitational field from a reference point of the object corresponding to the position-related information. In other words, the existence range of an object may be represented by expanding the existence range of the moving object to account for the influence of at least one of the inhomogeneous gravitational and external forces.

Similarly to the description provided with reference to FIG. 3 related to the existence range that takes into account the gravitational force and the external forces, elliptical trajectories and the effect of the inhomogeneous gravitational field and external forces will be described. FIG. 3 may illustrate the existence range of a moving object following an elliptical trajectory, which includes the existence range due to an inhomogeneous gravitational field and an external force. As illustrated in FIG. 3, the original elliptical trajectory 310 of an object may have a smooth curved shape. However, while the moving object travels along the elliptical trajectory 310, if the moving object is affected by an external factor, for example, at least one of an inhomogeneous gravitational field or an external force, the object may deviate from the defined elliptical trajectory 310 by a predetermined distance, and its motion may form a distorted, uneven shape. However, as illustrated in FIG. 3, if the existence range 311 of an object applied in a defined trajectory is defined to include the existence range 321 of the object in a trajectory affected by the inhomogeneous gravitational field or external forces, the trajectory of the object affected by the inhomogeneous gravitational field or external forces may be expressed by the original elliptical trajectory 310.

As illustrated in FIG. 3, the existence range 311-1 of an object following the elliptical trajectory at the first time point and the existence range 311-2 of an object following the elliptical trajectory at the second time point may be defined to include the existence range 321-2 of a trajectory reflecting the inhomogeneous gravitational field or external force. In other words, the existence range of an object may be set to include the maximum separation distance from the elliptical trajectory due to the inhomogeneous gravitational field or external forces; this is because the effect of the point mass gravitational field is more dominant than that of other external forces. Through the setting above, the possibility of collision may be examined by reflecting the case where the inhomogeneous gravitational field or external force is applied.

For a moving object on an elliptical trajectory, the existence range may also be expanded and reduced. According to one aspect, by converting to a point mass homogeneous gravitational field model that removes the inhomogeneous gravitational field and external forces through expansion of the existence range, it is possible to calculate the probability of collision by utilizing the existence ranges of two objects. The characteristics of a moving object may be defined by at least one of the existence range and the velocity range. Here, the existence ranges of two moving objects may be represented by two three-dimensional volumes as described above with reference to FIG. 2; for example, if the existence range of one of the moving objects is expanded to match the existence range of the other moving object, the other moving object may be represented without employing an existence range. One of the two moving objects may have an expanded existence range obtained by adding the existence range of the other moving object to the existing existence range, and the other moving object may have a reduced existence range represented only by the estimated position of the moving object.

For example, FIG. 4 illustrates existence ranges of two objects before their existence range is expanded, and FIG. 5 illustrates an existence range representation of one object according to the expansion of the existence range. As illustrated in FIG. 4, the existence range 411 of the third object 410 and the existence range 421 for the fourth object 420 may be represented by two three-dimensional volumes. Here, as shown in FIG. 5, if the existence range of the fourth object 420 is expanded to match the existence range of the third object 410, the fourth object 420 may have an expanded existence range 423, and the third object 410 may be represented without employing an existence range, which may be referred to as having a reduced existence range.

The existence range may also be represented by the maximum distance from an object to the existence range. For example, referring to FIGS. 4 and 5, the existing existence range 411 of the third object 410 may be represented by a first distance L41, and the existing existence range 421 of the fourth object 420 may be represented by a second distance L42. In this regard, if the existence range of the third object 410 is moved to the existence range of the fourth object 420, the fourth object 420 may have an expanded existence range 423 represented by a third distance L43, which is the sum of the first distance L41 and the second distance L42.

As described above, when the existence ranges of two moving objects are converted into an expanded existence range and a reduced existence range, the collision probability of the two moving objects may be calculated based on the relative distance between the position of the moving object with the reduced existence range and the center of the moving object with the expanded existence range. More specifically, for example, as shown in FIG. 5, the collision probability between the third object 410 and the fourth object 420 may be determined based on the maximum separation distance L43 from the center of the expanded existence range 423 of the fourth object 420 and the distance L44 between the third object 410 and the fourth object 420.

In relation to the description above, moving objects may have different existence ranges. FIG. 6 illustrates different existence ranges according to each object. As shown in FIG. 6, the existence range 611 of the fifth object 610, the existence range 621 of the sixth object 620, and the existence range 631 of the seventh object 630 may be different from each other. The position estimate of a moving object may have varying accuracy depending on which sensor or measurement method is used, and accordingly, the existence range may also vary depending on the sensor or measurement method employed. In addition, even when the same sensor or measurement method is used for the same moving object, the accuracy of the position estimate may gradually decrease over time with respect to the estimation time. Accordingly, different existence ranges may be applied to the same moving object depending on the time point at which the existence range is determined, and for example, the existence range may be configured to increase as time progresses from the time point of measuring the position estimate.

In one aspect of the present disclosure, the presence of different existence ranges for each moving object may increase the complexity of the process for determining a collision candidate object. Therefore, according to one aspect, it is possible to eliminate the existence range of one target for checking the possibility of a collision, i.e., the tracking target object and to collectively expand the existence range for each of the other moving objects, i.e., a plurality of objects to be examined. For example, the existing existence range of the tracking target object may be added to each of a plurality of objects having different existence ranges to form an expanded existence range, and the tracking target object may have a reduced existence range represented only by the estimated position of the tracking target object.

In other words, each of the plurality of objects, which are targets to be examined as to whether they are collision candidate objects, may be configured to have an expanded existence range obtained by adding the existence range of the tracking target object to each existence range, and the tracking target object may be configured to have a reduced existence range represented only by the estimated position of the tracking target object.

Therefore, according to one aspect of the present disclosure, an object having a possibility of collision with a tracking target object at a target time point may be understood as an object whose existence range at the target time point includes the position of the tracking target object. The description above may be referred to as the existence range of the corresponding object intruding on the tracking target object. In this regard, the tracking target object, which is a moving object being monitored for the occurrence of a collision, may be referred to as a 'subject' in the present disclosure, and a moving object approaching the collision point may be referred to as a 'potential intruder.' In the present disclosure, all of a plurality of objects excluding the tracking target object may act as 'potential intruders.' If the existence range of the potential intruder at the target time point includes the position of the subject, the collision probability for the subject may be calculated, and the potential intruder may be referred to as an 'intruder.'

The method for determining a collision candidate object according to the embodiments of the present disclosure may be, for example, intended to determine an object whose expanded existence range at the target time point is expected to include the position of the tracking target object as a collision candidate object. According to another aspect, more specifically, an object whose probability of collision with the tracking target object is greater than a threshold value may be determined as a collision candidate object. For example, the probability of collision of a first object with the collision candidate object may be determined based on the maximum separation distance from the center of the expanded existence range of the first object and the distance between the first object and the tracking target object; more specifically, the probability of collision of the first object with the collision candidate object may be determined as a ratio of the distance between the first object and the tracking target object to the maximum separation distance from the center of the expanded existence range of the first object.

FIG. 7 illustrates expansion of an existence range of an object over time. The operational velocity range of a plurality of objects, which are the subject of assessment as to whether they are potential intruders, i.e., collision candidates, may be specified by the minimum velocity $v_{min}$ and maximum velocity $v_{max}$. When the existence distance in the initial velocity direction for the initial existence range $V_{init}$ is $d_{init}$, the existence distance in the velocity direction of the object after t seconds when the object exhibits a straight-line motion may be calculated as follows.

$$d_t = d_{init} + (v_{max} - v_{min})\,t$$

As shown in FIG. 7, suppose that the existence distance in the initial velocity direction at t=0 is 20 km and the operational velocity range of each object is specified as 10 km/s to 11 km/s; the existence distance in the velocity direction after 10 seconds may be determined as 30 km, which is an increase of 10 km from the existence distance in the initial velocity direction, obtained by multiplying 10 seconds by 1 km/s, which is the difference between the maximum and minimum velocities.

Through the method above, a time-dependent existence range of a potential intruder may be defined. Meanwhile, all existence ranges may be represented by a range sphere whose volume is always greater than or equal to that of the existence range of the potential intruder. FIG. 8 illustrates a range sphere that includes an existence range. As shown in FIG. 8, for example, an object 810 having an existence range 811 in the ellipsoid shape may be represented by a range sphere 813, where the volume of the sphere is always greater than or equal to that of the existence range 811. The range sphere 813 may represent a spherical existence range with a diameter $D_{sphere}$, which corresponds to the maximum distance $d_{max}$ of the existence range.

FIG. 9 illustrates a circular range obtained by orthogonal projection of the range sphere of FIG. 8 onto a predetermined plane. According to one aspect of the present disclosure, the range sphere may be represented using a range circle by orthogonally projecting the range sphere onto a predetermined plane aligned with the movement direction. As illustrated in FIG. 9, for an object 810 having a range sphere 813, the existence range may be replaced with a two-dimensional range circle 815 drawn on a single plane, for example, an orthogonal projection onto the xy plane.

Figure 24:
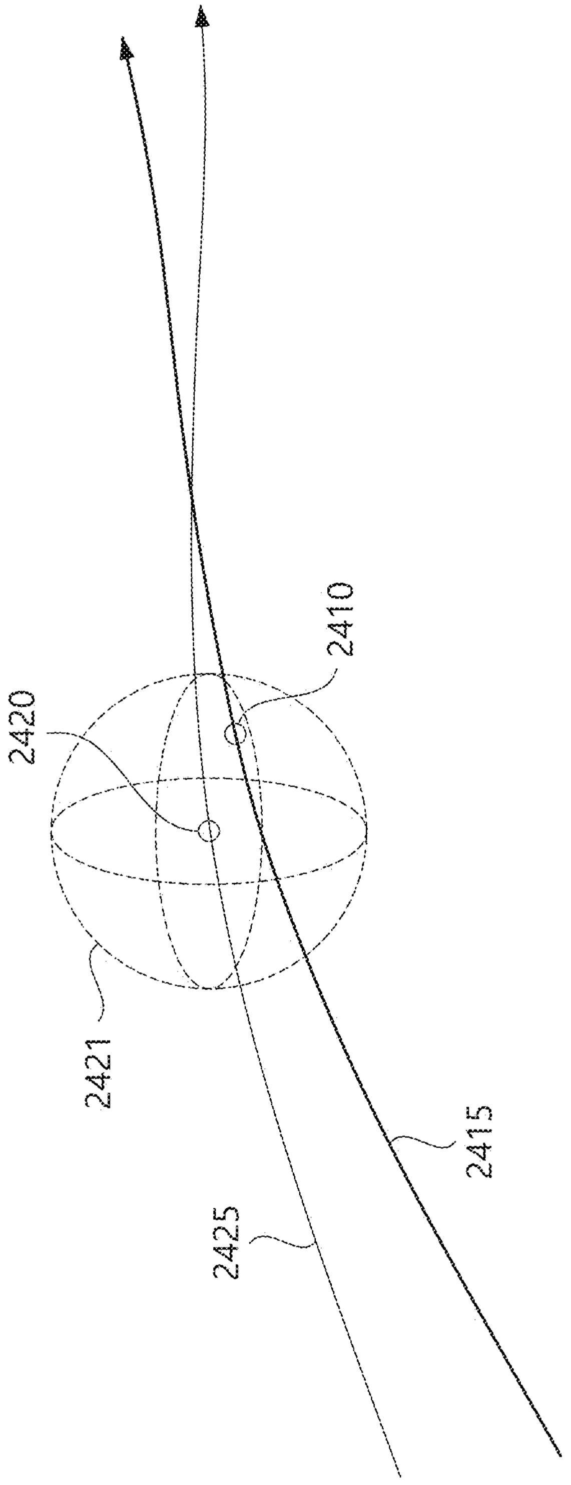
FIG. 24 illustrates a case in which one spherical range of a particular object among a plurality of objects includes a target object at a specific time point.

FIG. 24 illustrates a case in which one spherical range of a particular object among a plurality of objects includes a target object at a specific time point. As shown in FIG. 24, the existence range of a plurality of objects, i.e., potential intruders may be defined by utilizing a range sphere in the case of three-dimensions and a range circle in the case of two-dimensions. If the existence range 2421 of the potential intruder 2420, which moves along the trajectory 2525, includes the subject 2410 at the same time point when the subject passes, for example, target time point, it may be considered that a non-zero collision probability exists.

A method for determining a collision candidate object for a tracking target object among moving objects following an elliptical orbit according to an embodiment of the present disclosure may include determining whether a range sphere of a plurality of objects, i.e., a potential intruder includes the tracking target object at a specific time point, i.e., target time point. Here, the following two conditions may be utilized to determine whether the range sphere of the potential intruder includes the subject at a specific time point.

Condition 1: The time-series position information of an object that may approach a collision point Condition 2: The range that includes all trajectories of a space object moving on an elliptical orbit, which may approach a collision point.

Here, the 'collision point' may mean, for example, the position of the tracking target object at the target time point. To determine whether the collision candidate object reaches the collision point at the target time point and has a possibility of collision with the tracking target object, information on the position of the corresponding collision candidate object at each time point may be required. The information may be calculated, for example, by utilizing an orbit integrator. The orbit integrator may be configured to simulate the movement of a moving object, such as a satellite, which moves along an elliptical orbit.

Figure 25:
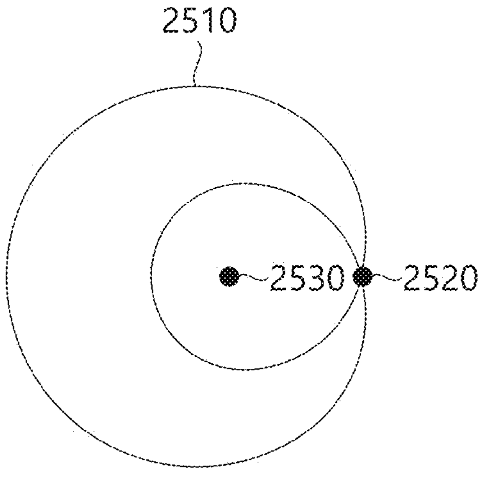
FIG. 25 illustrates part of elliptical orbits that may approach a collision point.

In relation to condition 2, an area that includes all elliptical orbits passing through the collision point may be defined, where the elliptical orbits are formed with respect to a specific reference point, such as the center of the Earth, for example. An area that includes all elliptical orbits passing through the collision point with the reference point as the center point may be referred to as an 'elliptical orbit existence area.' FIG. 25 illustrates part of elliptical orbits that may approach a collision point. As shown in FIG. 25, once an elliptical orbit is centered at the reference point 2530 and passes through the collision point 2520, the corresponding orbit may be included in the elliptical orbit existence area 2510. The elliptical orbit existence area 2510 may have a shape of a rose petal as shown on the right of FIG. 25; for example, a range may be specified by defining a Rose function. In the following description, the elliptical orbit existence area 2510 may be referred to as 'Hanik's rose petal.'

Figure 26:
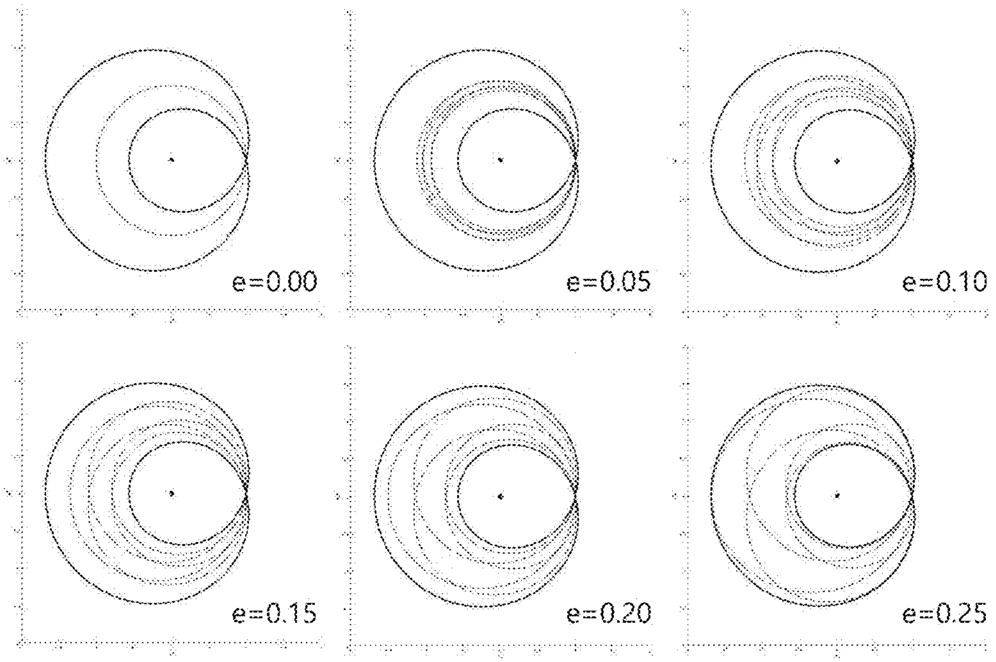
FIG. 26 illustrates variations of elliptical orbits according to eccentricity.

The elliptical orbit existence area will be described in more detail with reference to FIG. 26. FIG. 26 shows variations in elliptical orbits according to eccentricity. FIG. 26 specifically shows changes in the shape of an elliptical orbit according to changes in eccentricity. As illustrated in FIG. 26, the shape of an elliptical orbit (dotted line) may be modified depending on the eccentricity (expressed as 'e') value. Referring to the case of e=0 in FIG. 26, the orbit of the dotted line centered at the reference point and passing through the collision point becomes a circular orbit. Conversely, in the case of e=0.25, which has the largest eccentricity among the orbits illustrated in FIG. 26, various elliptical orbits centered at the reference point and passing through the collision point are illustrated with dotted lines. A plurality of elliptical orbits of e=0.25 may have the same eccentricity but different sizes and different inclinations. In the drawing illustrated in FIG. 26, since the elliptical orbits with e=0.25 come into contact with the Rose function illustrated, the coefficient values of the Rose function equation may be determined based on the contact behavior. Therefore, an elliptical orbit existence area may be defined using a Rose function equation with specific coefficient values. As illustrated in FIG. 26, as e gradually decreases from 0.25, a plurality of elliptical orbits having their own eccentricities and different degrees of inclination converge to the circular orbit where e=0. Therefore, in the rose petal-shaped elliptical orbit region according to the Rose function equation illustrated in FIG. 26, all elliptical orbits that center around the reference point and pass through the collision point are included within the rose petal-shaped area. Accordingly, the elliptical orbit existence area expressed by the Rose function equation having specific coefficients may include all elliptical orbits that center around the reference point and pass through the collision point.

Meanwhile, according to one aspect of the present disclosure, the trajectory of a moving object moving along an elliptical orbit with respect to a reference point may be defined within three dimensions; however, a two-dimensional area may be transformed to a three-dimensional area by, for example, rotating the two-dimensional area around an axis including the reference point and the collision point. Therefore, in what follows, a process for determining an area including a collision candidate object, based on a two-dimensional elliptical orbit existence area, will first be examined.

According to one aspect of the present disclosure, it is possible to define angular velocities of a plurality of objects using the maximum and minimum angular velocities of moving objects moving along an elliptical orbit included in a two-dimensional rose petal. The minimum angular velocity $\omega_{min}$ and maximum angular velocity $\omega_{max}$ of a plurality of objects following an elliptical orbit included in an elliptical orbit existence area may be defined by utilizing the characteristics of the elliptical orbits. Among a plurality of elliptical orbits included in the elliptical orbit existence area, the maximum semi-major axis $a_{max}$, which is the semi-major axis of the elliptical orbit with the largest semi-major axis, the minimum semi-major axis $a_{min}$, which is the semi-major axis of the elliptical orbit with the smallest semi-major axis, the maximum eccentricity $e_{max}$, which is the largest eccentricity among eccentricities of a plurality of elliptical orbits, and the minimum eccentricity $e_{min}$, which is the smallest eccentricity among eccentricities of a plurality of elliptical orbits may be used to define the maximum angular velocity and the minimum angular velocity of moving objects within the elliptical orbit existence area.

For example, the minimum angular velocity of moving objects may be defined as the angular velocity at the time point where the moving object is located farthest from the center point in an elliptical orbit satisfying the maximum semi-major axis and the minimum eccentricity. For example, the maximum angular velocity of moving objects may be defined as the angular velocity at the time point where the moving object is located farthest from the center point in an elliptical orbit satisfying the minimum semi-major axis and the maximum eccentricity.

Meanwhile, angular velocities for a plurality of objects may be defined based on the maximum angular velocity and the minimum angular velocity of a plurality of objects. For example, the angular velocity of a plurality of objects may be defined as the average of the maximum angular velocity and the minimum angular velocity, i.e., $(\omega_{min}+\omega_{max})/2$.

Figure 27:
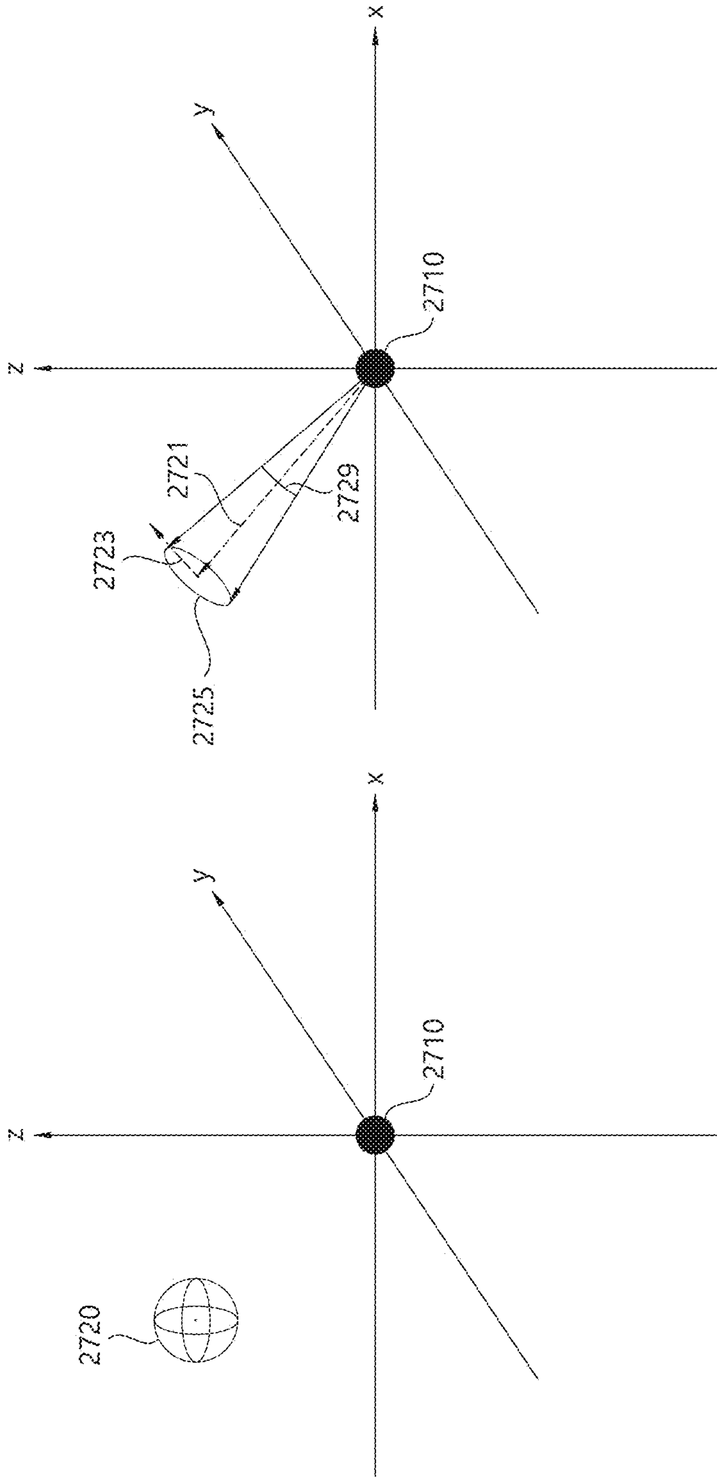
FIG. 27 illustrates an angular range for a specific object at a specific time point.

FIG. 27 illustrates an angular range for a specific object at a specific time point. The drawing on the left of FIG. 27 illustrates a range sphere for one of a plurality of objects examined in three dimensions. For example, each of the plurality of objects moves in an elliptical orbit centered at a reference point 2710, such as the point mass Earth. Therefore, a range sphere 2720, which is an existence range of a specific object among the plurality of objects at a specific time point, exists at each predetermined angular position with respect to the reference point 2710. Here, to determine the existence range of a collision candidate object based on the two-dimensional elliptical orbit existence range as described above, the region sphere may be required to be transformed into a form that may be represented in terms of angles within two dimensions. As illustrated on the right of FIG. 27, when a range sphere 2720 of a specific object is orthogonally projected on a plane perpendicular to an object vector 2721, which is a vector pointing from the reference point 2710 to the position of the specific object, a circle 2725 which is perpendicular to the object vector may be formed. Using the intersections of the vector perpendicular to the object vector 2721 and the circle 2725, a solid angle 2729 of the circle 2725 may be obtained. The solid angle of the circle 2725 may be defined as an angular range for the specific object at the specific time point. Accordingly, it is possible to estimate the range of each position in which a specific object may exist at a specific time point within a specific two-dimensional plane. If the angular range of a specific object at a specific time point is estimated, the angular range at other time points may also be estimated based on the minimum angular velocity and the maximum angular velocity of the object. The angular range $\theta_t$ of a specific object at time point t may be determined by adding an increased angular range according to the difference between the minimum angular velocity $\omega_{min}$ and the maximum angular velocity $\omega_{max}$ to the angular range $\theta_{init}$ at the time point when the angular range is initially estimated, where the angular range of the specific object may be determined by the following equation, for example.

$$\theta_t = \theta_{init} + (\omega_{max} - \omega_{min})\, t$$

Figure 28:
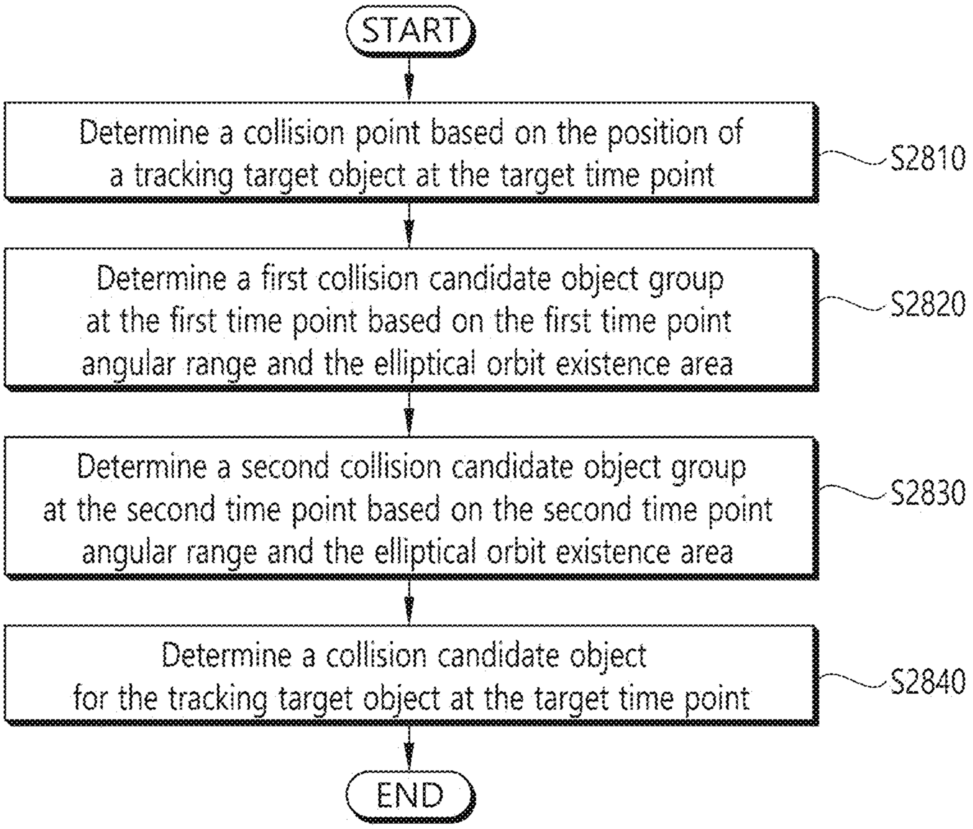
FIG. 28 is a flow diagram illustrating a method for determining a collision candidate object among objects along elliptical orbits according to one embodiment of the present disclosure.

FIG. 28 is a flow diagram illustrating a method for determining a collision candidate object among objects along elliptical orbits according to one embodiment of the present disclosure. The method for determining a collision candidate object according to one embodiment of the present disclosure may be performed by a computing device including a processor and a memory and provides a procedure for determining a collision candidate object for a tracking target object among a plurality of objects moving along an elliptical orbit based on a gravitational field from a reference point. In what follows, the method for determining a collision candidate object among elliptical orbit objects according to one embodiment of the present disclosure will be described in more detail with reference to FIG. 28.

As shown in FIG. 28, a method according to an embodiment of the present disclosure may comprise determining a collision point based on position-related information for a tracking target object at a target time point S2810; and determining a first collision candidate object group for the tracking target object at the target time point based on position-related information on each of a plurality of objects at a first time point prior to the target time point, first time point angular range information indicating an angular range centered around the reference point, in which the collision candidate object may exist at the first time point, and information on an elliptical orbit existence area that includes all elliptical orbits using the reference point as the center point and passing through the collision point S2820. According to one aspect, as in the general method for determining a collision candidate object described above, a second collision candidate object group at a second time point different from the first time point may be determined, and an object included in both the first and second collision candidate groups may be determined as a collision candidate object. In other words, a method according to one aspect may comprise determining a second collision candidate object group for the tracking target object at the target time point based on position-related information for each of a plurality of space objects at a second time point prior to the target time point, second time point range angular information representing an angular range centered at the reference point, in which the collision candidate object may exist at the second time point, and information on the elliptical orbit existence area; and determining at least one object included in both the first collision candidate object group and the second collision candidate object group as a collision candidate object for the tracking target object at the target time point.

Figure 29:
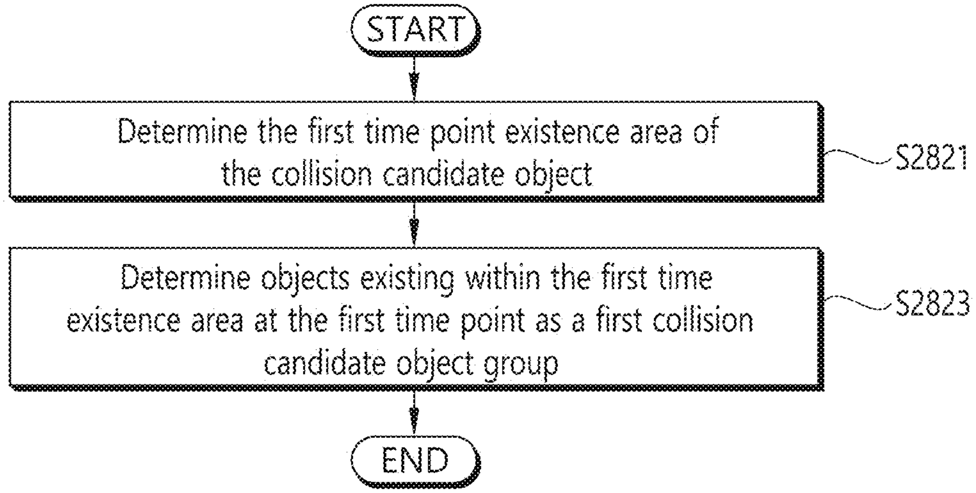
FIG. 29 is a detailed flow diagram illustrating the determining of a first collision candidate object group of FIG. 28.

In what follows, for the convenience of description, a procedure for determining a first collision candidate object group among a plurality of objects following an elliptical orbit, based on a specific time point, such as the first time point, will be described more specifically. FIG. 29 is a detailed flow diagram illustrating the determining of a first collision candidate object group of FIG. 28.

First, referring again to FIG. 28, the processor may determine a collision point based on the position-related information of the tracking target object at the target time point. When the position-related information of the tracking target object is received, which is the target of collision candidate object determination, and the existence range of the tracking target object according to one aspect is reduced, the tracking target object may be expressed as a predetermined point. The collision candidate object for the tracking target object may mean an object that approaches the predetermined point of the tracking target object at the target time point, and thus, the predetermined point may be expressed as a collision point. The method according to the embodiments of the present disclosure may be intended for determining an object with a possibility of approaching the collision point as a collision candidate object.

Referring again to FIG. 28, the processor may determine a first collision candidate object group using information related to the first time point before the target time point. The first collision candidate object group may be a set of objects that are expected to approach the tracking target object at the target time point, based on information on the first time point. According to one aspect, the first collision candidate object group may be determined based on the position-related information of each of the plurality of objects at the first time point, the first time point angular range information, and the elliptical orbit existence area information.

Here, the position-related information of each of the plurality of objects at the first time point indicates information on the position of each object at the first time point for determining whether the object is a collision candidate object; as described earlier in the present disclosure, the position-related information may include at least one of information on the position itself and information for determining the existence range according to uncertainty.

The first time point angular range information may represent an angular range in which a collision candidate object is expected to exist at the first time point, the angular range being centered at a reference position, which is the center of an elliptical orbit drawn by each object. As described earlier in the present disclosure, for example, the angular range may be determined based on the solid angle of an orthogonally projected circle or expanded based on the angular range at an estimated time point other than the first time point, the amount of change in time from the estimated time point, and maximum and minimum angular velocities.

As described earlier in the present disclosure, the elliptical orbit existence area may be the information that defines an area that includes all elliptical orbits passing through the collision point, with the reference point as the center.

With reference to FIG. 29, a procedure for determining a first collision candidate object group according to one aspect of the present disclosure will be described in more detail. As shown in FIG. 29, the determining of the first collision candidate object group S2820 may include determining a first time point existence area of a collision candidate object for a tracking target object at the target time point S2821; and determining objects positioned within the first time point existence area at the first time point among the plurality of objects as a first collision candidate object group S2823.

Figure 30:
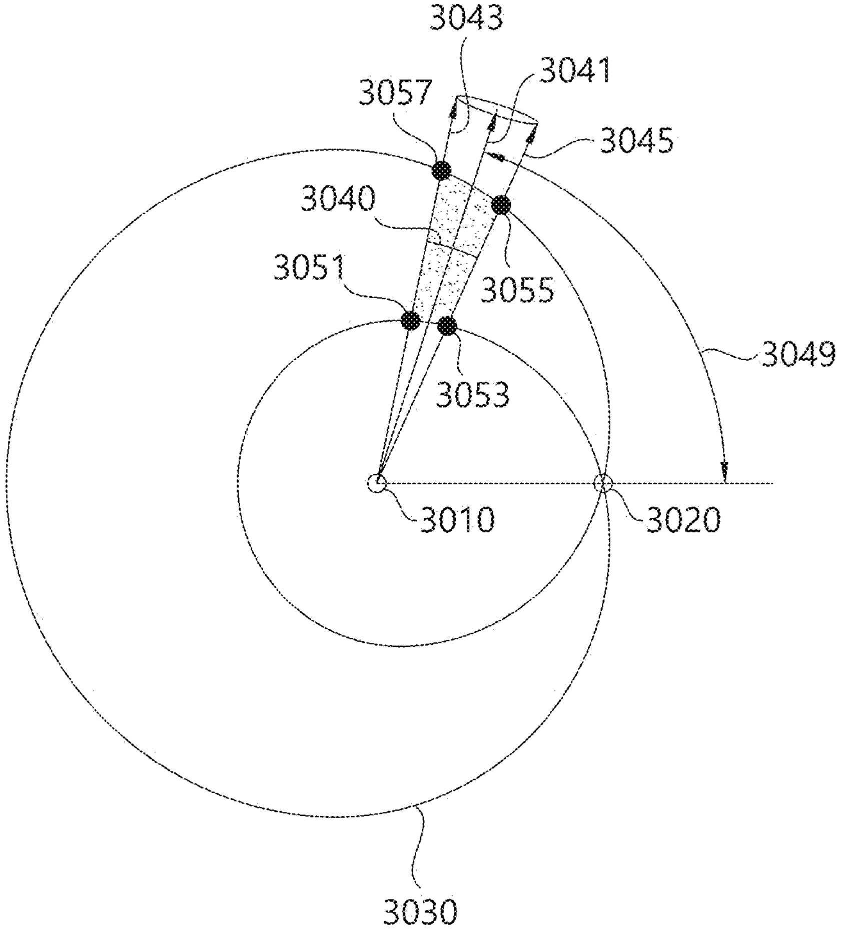
FIG. 30 illustrates intersection points between an elliptical orbit existence area and an angular range at a specific time point.

Here, the first time point existence area, in which a collision candidate object with a non-zero probability of collision with the tracking target object at the target time point is located at the first time point, may include an overlapping area between an angular range according to the first time point angular range information and the elliptical orbit existence area. FIG. 30 illustrates intersection points between an elliptical orbit existence area and an angular range at a specific time point.

As shown in FIG. 30, the first time point existence area may first be expressed on a predetermined, two-dimensional plane. The elliptical orbit existence area 3030 included in the two-dimensional plane includes all elliptical orbits centered at the reference point 3010 and passing through the collision point 3020. As described earlier in the present disclosure, the elliptical orbital existence area 3030 may be expressed as a Rose function having coefficients configured so that the area defined by the function includes all elliptical orbits centered at the reference point 3010 and passing through the collision point 3020. Therefore, the processor of the computing device may easily determine whether a specific position belongs to the elliptical orbit existence area based on the corresponding function. According to one aspect, more specifically, the Rose function may be a Limacon function. However, it should be noted that the elliptical orbit existence area of the present disclosure is not limited to the area defined by the specific function above; rather, the elliptical orbit existence area may be determined using an arbitrary method that defines an area encompassing all areas in which elliptical orbits centered at the reference point and passing through the collision point are included.

Referring again to FIG. 30, the first time point angular range may represent an angular range of angular position within a two-dimensional plane including the elliptical orbit existence area, in which an object with a possibility of collision with a tracking target object at a target time point exists. The first time point angular range may be expressed by the area between a line segment 3045 representing the first angular position and a line segment 3057 representing the second angular position. According to one aspect, estimation of the existence range and the angular range of an object located at the collision point at the target time point may be performed, and the angular range for the first time point may be determined based on the change in time between the target time point and the first time point. At this time, according to one aspect, the central angular position 3041 of the first time point angular range may be separated from the angular position of the collision point by the angle 3049 obtained by multiplying the average angular velocity of a plurality of objects from the angular position of the collision point by the time interval between the target time point and the first time point. Here, the average angular velocity may be an average of the maximum angular velocity and the minimum angular velocity of the plurality of objects, as described above. Therefore, if a specific object exists at the angular position of the collision point at the target time point, it may be inferred that, assuming the object rotates with the average angular velocity during the time interval between the target time point and the first time point, the object is expected to be positioned at the central angular position 3041 of the first time point angular range.

As described above, the angular range at a specific time point may be estimated by adding the increase range according to time change to the angular range at the estimated time point. Therefore, according to one aspect, the angular range of the first time point for the collision candidate object may be determined by adding the variation range determined based on the maximum and minimum angular velocities of a plurality of objects and the time interval between the target time point and the first time point to the reference angular range including the object existence range at the target time point. More specifically, the angular range at the first time point may be determined by adding the angle obtained by multiplying the range between the maximum and minimum errors of the angular velocity and the time interval between the target time point and the first time point to the initial angular range of the object estimated at the target time point.

Here, as described earlier in the present disclosure, the maximum angular velocity may be an angular velocity when an object is at the farthest position from the reference point in an elliptical orbit having the largest semi-major axis and the smallest eccentricity among the elliptical orbits of the plurality of objects, and the minimum angular velocity may be an angular velocity when the object is at the farthest position from the reference point in an elliptical orbit having the smallest semi-major axis and the largest eccentricity among the elliptical orbits of the plurality of objects.

Meanwhile, since the estimated existence ranges for each of the plurality of objects may be different, for example, the existence range of each of the objects estimated at the target time point and the reference angular range according to the existence range may also be different from each other. Therefore, different first time point angular ranges may be set for the respective objects. According to another embodiment, to simplify and improve the efficiency of the decision process, the reference angular range may be determined based on, for example, the largest existence range or the existence range at the target time point for the tracking target object, and the same first time point angular range may be set for all objects to determine the first time point existence area. Also, it is also possible to estimate the existence range at a different time point, not at the target time point, and determine the first time point angular range based on the time interval between the different time point and the first time point.

Referring again to FIG. 30, a common area of the first time point angular range and the elliptical orbit existence area may be determined as the first time point existence area. In the present disclosure, an object included in the existence area at a specific time point may be referred to as a ‘potential shooter.’ The ‘potential shooter’ at the first time point may refer to objects existing within the area formed by the first intersection 3051, the second intersection 3053, the third intersection 3055, and the fourth intersection 3057 at the first time point, as described in FIG. 30. Since the ‘potential shooters’ are included in both the elliptical orbital existence area and the angular range at the first time point, the existence range of the target time point may have a non-zero probability of including the collision point 3020.

Figure 31:
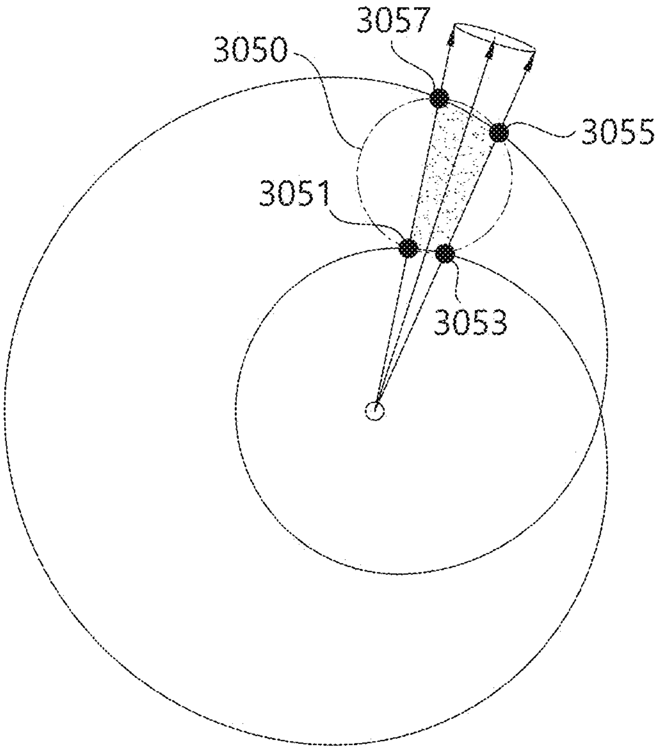
FIG. 31 illustrates the definition of an ellipse that includes the intersections of FIG. 30.

FIG. 31 illustrates the definition of an ellipse that includes the intersections of FIG. 30. As shown in FIGS. 30 and 31, according to one aspect of the present disclosure, the overlapping area between the angular range according to the first time point angular range information and the elliptical orbit existence area may be expressed as a function defining an ellipse 3050 that includes all of four intersections 3051, 3053, 3055, 3057 between two line segments 3043, 3045 representing the angular range and the elliptical orbit existence area 3030.

It is required to determine whether a specific object among a plurality of objects is included in the first time point existence area at the first time point. In determining whether the first time point existence area is included by the processor of the computing device, expressing the first time point existence area as a specific function may be advantageous for the implementation of a more efficient process. According to one aspect of the present disclosure, as illustrated in FIG. 31, an elliptical area 3050 including a first intersection 3051, a second intersection 3053, a third intersection 3055, and a fourth intersection 3057 at the first time point may be defined. Therefore, the first time point existence area may be defined as a function representing the elliptical area 3050 including the first intersection 3051, the second intersection 3053, the third intersection 3055, and the fourth intersection 3057 at the first time point, and based on the function, it may be easily determined whether any one of the plurality of objects is included in the first time point existence area.

Figure 32:
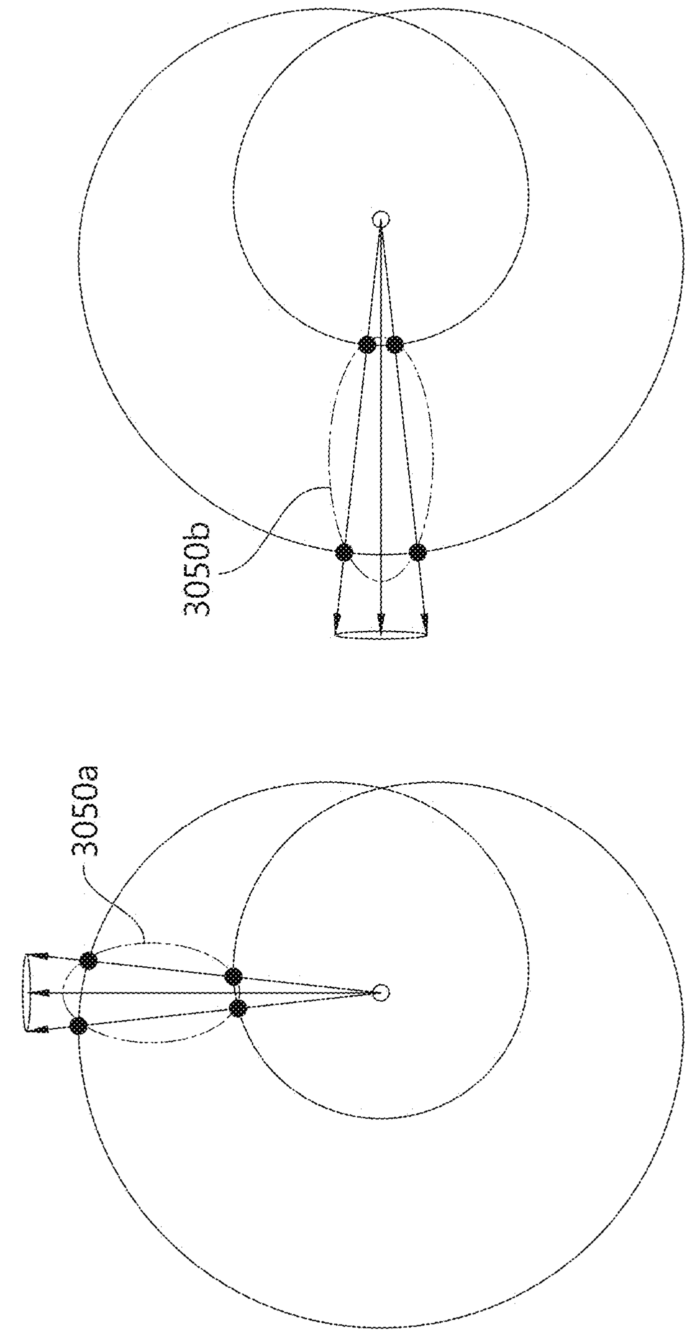
FIG. 32 illustrates determination of a collision candidate object group at two different time points.

Similar to the collision candidate object determination procedure applied for general objects, in determining a collision candidate object among objects following elliptical orbits, the first collision candidate object group and the second collision candidate object group may be determined for each of two or more different time points, and objects belonging to both groups may be determined as collision candidate objects. FIG. 32 illustrates determination of a collision candidate object group at two different time points. As illustrated in FIG. 32, it is possible to define an ellipse passing through the intersections of the elliptical orbit existence area at a time point in the past relative to the collision point and the angular range at the corresponding time point. For example, a first ellipse 3050*a* for the first time point and a second ellipse 3050*b* for the second time point may be defined. If there exists the same potential intruder at two different time points at which areas of the ellipses do not overlap, namely, an object that belongs to the first ellipse 3050*a* at the first time point and exists within the second ellipse 3050*b* at the second time point, the object may be determined as a collision candidate object. In the present disclosure, the collision candidate object may also be referred to as a 'shooter.' A shooter is a potential intruder that is likely to be an intruder having a high probability of collision, and the determination of a collision candidate object may be made by utilizing the method described above.

Figure 33:
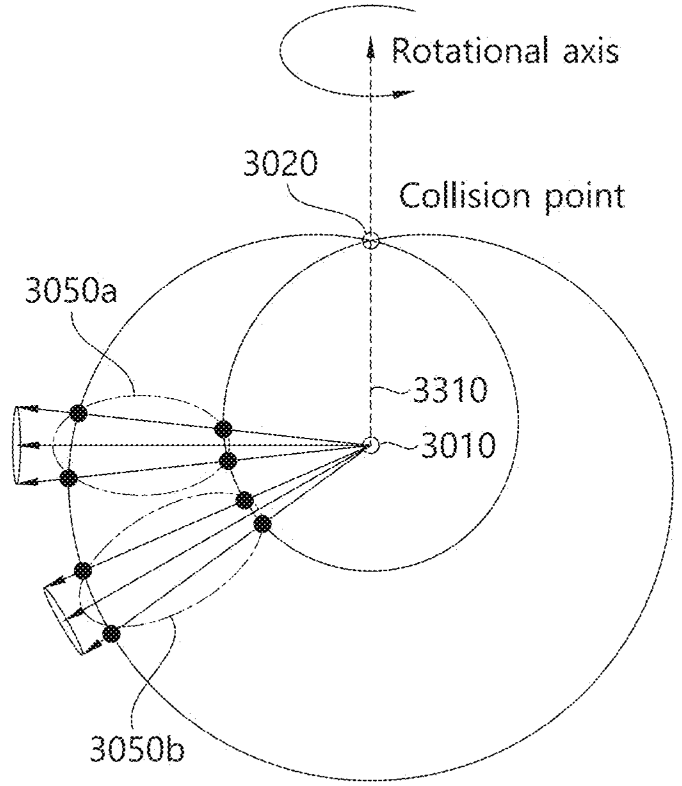
FIG. 33 illustrates two ellipses, representing collision candidate object groups, expressed in two-dimensions.
Figure 34:
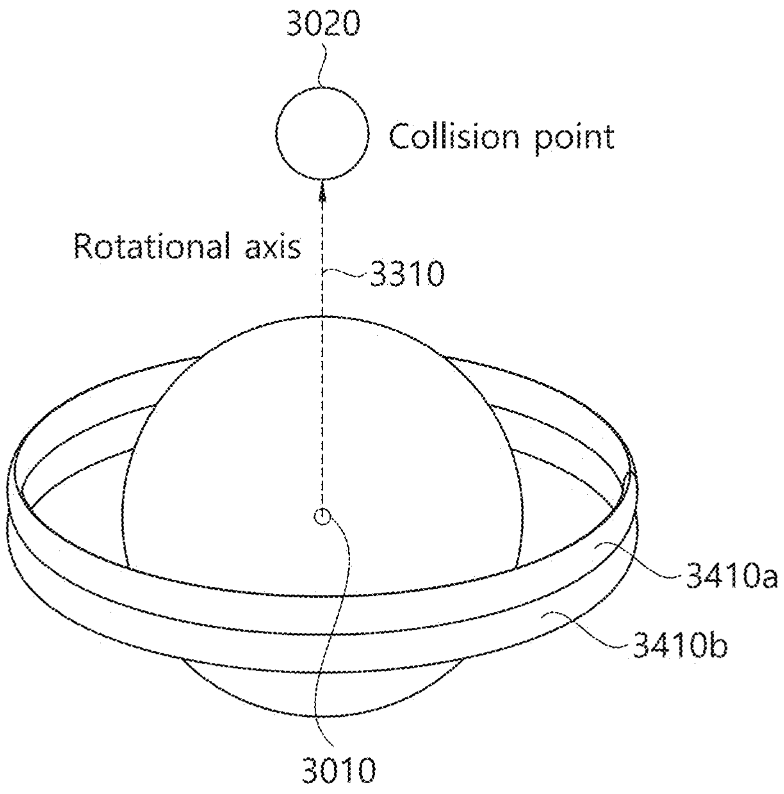
FIG. 34 illustrates two tori obtained by axially symmetric transformation of the ellipse of FIG. 33.

FIG. 33 illustrates two ellipses, representing collision candidate object groups, expressed in two-dimensions, and FIG. 34 illustrates two tori obtained by axial symmetric transformation of the ellipse of FIG. 33. As described above, an existence area at a specific time point in the three-dimensional space may be formed by first setting an existence area at the specific time point based on an elliptical orbit existence area included in a specific, two-dimensional plane and an angular range at the specific time point; and performing axially symmetric transformation on the existence area at the specific time point. According to one aspect of the present disclosure, the first time point existence area may be a toroidal area formed by axial symmetric transformation of an ellipse, which includes all four intersection points, around a rotation axis passing through both a reference point and a collision point. In this regard, potential intruders approaching the collision point are axially symmetric with respect to the collision point vector. In other words, the potential intruders located within the torus formed by axial symmetric rotation of the potential shooter ellipses may be classified as potential shooters. A potential shooter belonging to both tori becomes a shooter, and all shooters may be classified as collision candidate objects.

To describe more specifically with reference to FIG. 33, first, an overlapping area between the elliptical orbit existence area and the first time point angular range within the two-dimensional plane may be defined as a first ellipse 3050*a*, and an overlapping area between the elliptical orbit existence area and the second time point angular range may be defined as a second ellipse 3050*b*. If axially symmetric transformation is performed on the first ellipse 3050*a* and the second ellipse 3050*b* around a symmetric axis 3310 passing through both the reference point 3010 and the collision point 3020, a first torus 3410*a* and a second torus 3410*b*, as shown in FIG. 34, may be formed. Objects whose positions at the first time point are included in the first torus 3410*a* may be classified as the first collision candidate object group determined based on the first time point, and objects whose positions at the second time point are included in the second torus 3410*b* may be classified as the second collision candidate object group, determined based on the second time point. An object included in both the first collision candidate object group and the second collision candidate object group may be determined as a collision candidate object group for the tracking target object at the target time point.

Apparatus for Determining a Collision Candidate Object

An apparatus for determining a collision candidate object for a tracking target according to one embodiment of the present disclosure comprises a processor and a memory, wherein the processor may be configured to obtain position-related information for a tracking target object at a target time point, determine a first collision candidate object group for the tracking target object at the target time point based on position-related information on each of a plurality of objects at a first time point prior to the target time point and position-related information on the tracking target object at the target time point, determine a second collision candidate object group for the tracking target object at the target time point based on position-related information on each of a plurality of objects at a second time point prior to the first time point and position-related information on the tracking target object at the target time point, and determine at least one object included in both the first collision candidate object group and the second collision candidate object group as a collision candidate object for the tracking target object at the target time point.

Specific operations of the apparatus for determining a collision candidate object according to one aspect of the present disclosure may follow at least part of the method for determining a collision candidate object according to one aspect of the present disclosure described above.

Also, an apparatus for determining a collision candidate object for a tracking target object among a plurality of space objects according to one aspect of the present disclosure may comprise a processor and a memory, wherein the processor may be configured to determine a collision point based on position-related information for a tracking target object at a target time point; and determine a first collision candidate object group for the tracking target object at the target time point based on position-related information on each of a plurality of objects at a first time point prior to the target time point, first time point angular range information indicating an angular range centered around the reference point, in which the collision candidate object may exist at the first time point, and information on an elliptical orbit existence area that includes all elliptical orbits using the reference point as the center point and passing through the collision point.

Specific operations of the apparatus for determining a collision candidate object among space objects according to one aspect of the present disclosure may follow at least part of the method for determining a collision candidate object among space objects according to one aspect of the present disclosure described above.

Figure 22:
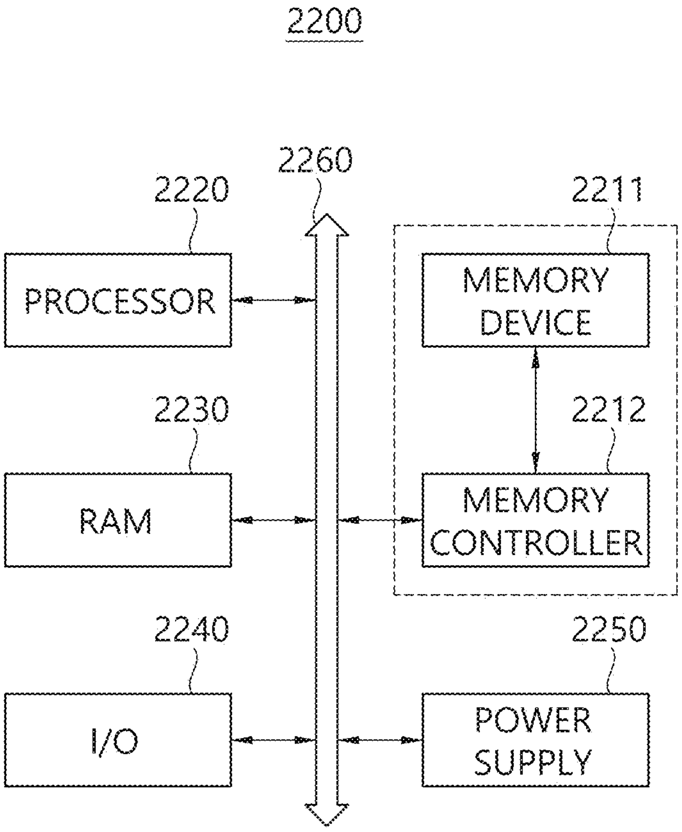
FIG. 22 is a block diagram illustrating an exemplary structure of a computing system in which a method according to one embodiment of the present disclosure may be implemented.

FIG. 22 is a block diagram illustrating an exemplary structure of a computing system that may be implemented using an apparatus according to one embodiment of the present disclosure.

Referring to FIG. 22, the computing system 2200 may include a flash storage 2210, a processor 2220, a RAM 2230, an input/output device 2240, and a power supply 2250. Also, the flash storage 2210 may include a memory device 2211 and a memory controller 2212.

Meanwhile, although not shown in FIG. 22, the computing system 2200 may further include ports that may communicate with a video card, a sound card, a memory card, a USB device, or other electronic devices.

The computing system 2200 may be implemented as a personal computer or may be implemented as a portable electronic device such as a notebook computer, a mobile phone, a personal digital assistant (PDA), and a camera.

The processor 2220 may perform specific calculations or tasks. According to an embodiment, the processor 2220 may be a microprocessor or a central processing unit CPU. The processor 2220 may communicate with the RAM 2230, the input/output device 2240, and the flash storage 2210 via a bus 2260, such as an address bus, a control bus, and a data bus.

According to one embodiment, the processor 2220 may also be connected to an expansion bus, such as a Peripheral Component Interconnect (PCI) bus.

The RAM 2230 may store data required for the operation of the computing system 2200. For example, any type of random access memory including DRAM, mobile DRAM, SRAM, PRAM, FRAM, MRAM, and RRAM may be used as RAM 2230.

The input/output device 2240 may include input means such as a keyboard, a keypad, and a mouse and output means such as a printer and a display. The power supply 2250 may supply operating voltage required for the operation of the computing system 2200.

The methods according to the present disclosure described above may be implemented as computer-readable codes on a computer-readable recording medium. The computer-readable recording medium includes all types of recording media storing data that may be deciphered by a computer system. For example, the computer-readable recording medium may include a Read Only Memory (ROM), a Random Access Memory (RAM), a magnetic tape, a magnetic disk, a flash memory, and an optical data storage device. Also, the computer-readable recording medium may be distributed over computer systems connected to a computer communication network and stored and executed as readable codes in a distributed manner.

In this document, the present disclosure has been described with reference to appended drawings and embodiments, but the technical scope of the present disclosure is not limited to the drawings or embodiments. Rather, it should be understood by those skilled in the art to which the present disclosure belongs that the present disclosure may be modified or changed in various ways without departing from the technical principles and scope of the present disclosure disclosed by the appended claims below.

More specifically, the characteristic features described above may be executed by a digital electronic circuit, computer hardware, firmware, or a combination thereof. The characteristic features may, for example, be executed by a computer program product implemented within a storage apparatus of a machine-readable storage device so that they may be executed by a programmable processor. And the characteristic features may be executed by a programmable processor which executes a program of instructions for performing functions of the aforementioned embodiments as they are operated based on the input data to produce an output. The characteristic features described above may be executed within one or more computer programs which may be executed on a programmable system including at least one programmable processor, at least one input device, and at least one output device, which are combined to receive data and instructions from a data storage system and to transmit data and instructions to the data storage system. A computer program includes a set of instructions which may be used directly or indirectly within the computer to perform a specific operation with respect to a predetermined result. The computer program may be written by any one of programming languages including compiled or interpreted languages and may be used in any other form including a module, element, subroutine, other appropriate unit to be used in a different computing environment, or program which may be manipulated independently.

Processors appropriate for executing a program of instructions include, for example, both of general-purpose and special-purpose microprocessors, single processor, or multiprocessors of a different type of computer. Also, storage devices appropriate for implementing computer program instructions and data which implement the characteristic features described above include all kinds of non-volatile storage devices: for example, semiconductor memory devices such as EPROM, EEPROM, and flash memory devices; internal hard disks; magnetic devices such as removable disks; optical magnetic disks; CD-ROM; and DVD-ROM disks. The processor and memory may be integrated within application-specific integrated circuits (ASICs) or added by the ASICs.

Although the present disclosure is described based on a series of functional blocks, the present disclosure is not limited to the embodiments described above and the appended drawings; rather, it should be clearly understood by those skilled in the art to which the present disclosure belongs that various substitutions, modifications, and variations of the present disclosure may be made without departing from the technical principles and scope of the present disclosure.

A combination of the aforementioned embodiments is not limited to the embodiments described above, but depending on implementation and/or needs, not only the aforementioned embodiments but also a combination of various other forms may be provided.

In the embodiments described above, methods are described according to a flow diagram by using a series of steps and blocks. However, the present disclosure is not limited to a specific order of the steps, and some steps may be performed with different steps and in a different order from those described above or simultaneously. Also, it should be understood by those skilled in the art that the steps shown in the flow diagram are not exclusive, other steps may be further included, or one or more steps of the flow diagram may be deleted without influencing the technical scope of the present disclosure.

The embodiments described above include examples of various aspects. Although it is not possible to describe all the possible combinations to illustrate the various aspects, it would be understood by those skilled in the corresponding technical field that various other combinations are possible. Therefore, it may be regarded that the present disclosure includes all of the other substitutions, modifications, and changes belonging to the technical scope defined by the appended claims.

What is claimed is:

1. A method for determining a collision candidate object for a tracking target object, performed by a computing device that includes a processor and a memory, the method comprising:

obtaining position-related information for a tracking target object at a target time point;

determining a first collision candidate object group for the tracking target object at the target time point based on position-related information on each of a plurality of objects at a first time point prior to the target time point and position-related information on the tracking target object at the target time point;

determining a second collision candidate object group for the tracking target object at the target time point based on position-related information on each of a plurality of objects at a second time point prior to the first time point and position-related information on the tracking target object at the target time point; and determining at least one object included in both the first collision candidate object group and the second collision candidate object group as a collision candidate object for the tracking target object at the target time point, wherein the determining of the first collision candidate object group includes:

determining a first time point existence area of a collision candidate object for a tracking target object at the target time point; and determining objects positioned within the first time point existence area at the first time point among the plurality of objects as a first collision candidate object group, and wherein the first time point existence area is determined based on the position of a tracking target object at the target time point, a maximum velocity and a minimum velocity of the plurality of objects, and a time interval between the target time point and the first time point.

2. The method of claim 1, wherein the position-related information corresponding to the tracking target object or at least one object among the plurality of objects includes at least one of position range determination information or velocity information for an object corresponding to the position-related information.

3. The method of claim 2, wherein the position range determination information includes at least one of position estimation information or position error information for an object corresponding to the position-related information, and an existence range of an object corresponding to the position-related information, being centered at an estimated position according to the position estimation information, includes a maximum error range according to the position error information.

4. The method of claim 3, wherein the existence range of an object corresponding to the position-related information is defined to further include a maximum separation distance deviated by at least one of a gravitational force or an external force from a defined trajectory of the object corresponding to the position-related information.

5. The method of claim 3, wherein each of the plurality of objects has a further expanded existence range obtained by adding the existence range of the tracking target object to each existence range, and the tracking target object has a reduced existence range expressed only with an estimated position of the tracking target object.

6. The method of claim 5, wherein a collision probability of a first object for the tracking target object is determined based on a maximum separation distance from the center of the expanded existence range of the first object and the distance between the first object and the tracking target object.

7. The method of claim 5, wherein the method is intended to determine an object of which the expanded existence range at the target time point is expected to include the position of the tracking target object as the collision candidate object.

8. The method of claim 3, wherein the existence range is configured to increase as time elapses from a measurement time point of the position estimation information.

9. The method of claim 1, wherein the first time point existence area has a three-dimensional spherical shell shape having a center at the position of a tracking target object at the target time point; a diameter determined according to the maximum velocity and minimum velocity and the time interval between the target time point and the first time point; and a first width in a direction toward the center.

10. The method of claim 9, wherein the first width is determined based on an existence range for a plurality of objects at the target time point; the existence range increasing according to the maximum velocity, the minimum velocity, and a time interval between the target time point and the first time point; and the existence range increasing according to at least one of a gravitational force or an external force.

11. The method of claim 9, wherein the first time point existence area is determined as the three-dimensional spherical shell shape applied to at least one of a satellite, an unmanned aerial vehicle, or a drone.

12. The method of claim 1, wherein the first time point existence area has a two-dimensional annular disk shape having a center at the position of a tracking target object at the target time point; having a diameter determined according to the maximum velocity, the minimum velocity, and a time interval between the target time point and the first time point; having a second width in a direction toward the center; and being included in a predetermined plane.

13. The method of claim 12, wherein the second width is determined based on an existence range for a plurality of objects at the target time point; the existence range increasing according to the maximum velocity, the minimum velocity, and a time interval between the target time point and the first time point; and the existence range increasing according to at least one of a gravitational force or an external force.

14. The method of claim 12, wherein the first time point existence area is determined as the two-dimensional annular disk shape applied to at least one of a ship or an autonomous driving vehicle.

15. The method of claim 1, wherein the determining of the second collision candidate object group includes:

determining a second time point existence area of a collision candidate object for a tracking target object at the target time point; and determining objects positioned within the second time point existence area at the second time point among the plurality of objects as a second collision candidate object group.

16. The method of claim 15, wherein the second time point existence area is determined based on the position of a tracking target object at the target time point, the maximum velocity and the minimum velocity of the plurality of objects, and a time interval between the target time point and the second time point.

17. An apparatus for determining a collision candidate object for a tracking target, the apparatus comprising a processor and a memory, wherein the processor is configured to:

obtain position-related information for a tracking target object at a target time point;

determine a first collision candidate object group for the tracking target object at the target time point based on position-related information on each of a plurality of objects at a first time point prior to the target time point and position-related information on the tracking target object at the target time point;

determine a second collision candidate object group for the tracking target object at the target time point based on position-related information on each of a plurality of objects at a second time point prior to the first time point and position-related information on the tracking target object at the target time point; and determine at least one object included in both the first collision candidate object group and the second collision candidate object group as a collision candidate object for the tracking target object at the target time point, wherein the processor is further configured to, in determining of the first collision candidate object group:

determine a first time point existence area of a collision candidate object for a tracking target object at the target time point; and determine objects positioned within the first time point existence area at the first time point among the plurality of objects as a first collision candidate object group, and wherein the first time point existence area is determined based on the position of a tracking target object at the target time point, a maximum velocity and a minimum velocity of the plurality of objects, and a time interval between the target time point and the first time point.

18. A non-transitory computer-readable storage medium including commands executable by a processor, wherein the commands are configured to instruct the processor to:

obtain position-related information for a tracking target object at a target time point;

determine a first collision candidate object group for the tracking target object at the target time point based on position-related information on each of a plurality of objects at a first time point prior to the target time point and position-related information on the tracking target object at the target time point;

determine a second collision candidate object group for the tracking target object at the target time point based on position-related information on each of a plurality of objects at a second time point prior to the first time point and position-related information on the tracking target object at the target time point; and determine at least one object included in both the first collision candidate object group and the second collision candidate object group as a collision candidate object for the tracking target object at the target time point, wherein the commands are further configured to: in determining of the first collision candidate object group, instruct the processor to:

determine a first time point existence area of a collision candidate object for a tracking target object at the target time point; and determine objects positioned within the first time point existence area at the first time point among the plurality of objects as a first collision candidate object group, and wherein the first time point existence area is determined based on the position of a tracking target object at the target time point, a maximum velocity and a minimum velocity of the plurality of objects, and a time interval between the target time point and the first time point.

* * * * *